(12) United States Patent
Komura et al.

(10) Patent No.: US 7,269,309 B2
(45) Date of Patent: Sep. 11, 2007

(54) OPTICAL WAVEGUIDE DEVICE, MANUFACTURING METHOD FOR OPTICAL WAVEGUIDE DEVICE AND INTERMEDIATE OF OPTICAL WAVEGUIDE DEVICE

(75) Inventors: Yoshiyuki Komura, Kyotanabe (JP); Kazuyuki Hayamizu, Kyotanabe (JP); Masayoshi Higuchi, Soraku-gun (JP); Hisashi Taniguchi, Kyotanabe (JP); Yukari Terakawa, Kyoto (JP); Hayami Hosokawa, Tsuzuki-gun (JP)

(73) Assignee: Omron Corporation, Kyoto (JP)

( * ) Notice: Subject to any disclaimer, the term of this patent is extended or adjusted under 35 U.S.C. 154(b) by 98 days.

(21) Appl. No.: 11/082,519

(22) Filed: Mar. 17, 2005

(65) Prior Publication Data
US 2005/0207718 A1 Sep. 22, 2005

(30) Foreign Application Priority Data
Mar. 17, 2004 (JP) ............................. 2004-077278

(51) Int. Cl.
*G02B 6/10* (2006.01)
(52) U.S. Cl. ........................................ 385/14; 385/129
(58) Field of Classification Search .................... None
See application file for complete search history.

(56) References Cited

U.S. PATENT DOCUMENTS

2004/0062484 A1* 4/2004 Germann et al. ............ 385/49

2004/0184702 A1* 9/2004 Hayamizu et al. ............ 385/14

FOREIGN PATENT DOCUMENTS

| JP | 8-201649 | 8/1996 |
|---|---|---|
| JP | 10-048460 | 2/1998 |
| JP | 11-183750 | 7/1999 |
| JP | 2000-206353 | 7/2000 |
| JP | 2001-281479 | 10/2001 |
| JP | 2003-240996 | 8/2003 |
| JP | 2004-78084 | 3/2004 |

OTHER PUBLICATIONS

Patent Abstracts of Japan; Publication No. 08-201649 dated Aug. 9, 1996 (2 pages).

(Continued)

*Primary Examiner*—Rodney Bovernick
*Assistant Examiner*—Mike Stahl
(74) *Attorney, Agent, or Firm*—Osha Liang LLP

(57) ABSTRACT

The spacers 3 and 4 and the recess is formed on the supporting substrate 2 to support the upper cladding layer 7. The intermediate surface 22 and 23 lower than the top surface of the spacers 3 and 4 and higher than the inner bottom surface of the recess is formed on the supporting substrate 2. Each of the height between the top surface of the spacers 3 and 4 and the intermediate surfaces 22 and 23, and the height between the intermediate surfaces 22 and 23 and the inner bottom surface of the recess of the second substrate 2 becomes thin compared with the total thickness of the lower cladding layer. Thus, when the resin for the lower cladding layer 9 is cured to shrinkage, the inner stress in the resin is dispersed and the occurrence of the wrinkle 12 and the void decreases.

20 Claims, 27 Drawing Sheets

OTHER PUBLICATIONS

Patent Abstracts of Japan; Publication No. 11-183750 dated Jul. 9, 1999 (2 pages).

Patent Abstracts of Japan; Publication No. 2000-206353 dated Jul. 28, 2000 (2 pages).

Patent Abstracts of Japan; Publication No. 2003-240996 dated Aug. 27, 2003 (2 pages).

Patent Abstracts of Japan; Publication No. 2004-078084 dated Mar. 11, 2004 (2 pages).

Patent Abstracts of Japan for Publication No. 2001-281479, Publication Date Oct. 10, 2001 (2 pages).

Patents Abstracts of Japan for Publication No. 10-048460, Publication date Feb. 20, 1998 (2 pages).

Office Action Chinese Patent Application No. 2005100563163, mailed Aug. 4, 2006, (7 pages).

Mechanical English Translations of Japenese Patent Application No. 2001281479, filed Oct. 10, 2001, (18 pages).

Mechanical English translation of Japanese Patent Application No. 10-048460, filed Feb. 20, 1998, (19 pages).

\* cited by examiner

PRIOR ART

PRIOR ART

PRIOR ART

PRIOR ART

PRIOR ART

PRIOR ART

PRIOR ART

OPTICAL WAVEGUIDE DEVICE, MANUFACTURING METHOD FOR OPTICAL WAVEGUIDE DEVICE AND INTERMEDIATE OF OPTICAL WAVEGUIDE DEVICE

BACKGROUND OF THE INVENTION

1. Field of the Invention

The invention relates generally to waveguide equipment, production methods thereof, and intermediates thereof.

2. Background Art

In a connected portion and an end portion of an optical fiber cable for optical communications, waveguide equipment is used to connect the end of one optical fiber cable to, for example, another optical fiber cable, a light projection device, a photo detector, etc. Such waveguide equipment has been made of a quartz material of low loss in an infrared wavelength region. Recently, waveguide equipment with a polymer waveguide has been made of polymer material with low cost. For example, the waveguide equipment comprises the polymer waveguide on a silicon substrate.

Inventors of the present invention produced the waveguide equipment shown in FIG. 1 and FIG. 2. FIG. 1 is a perspective view of the waveguide equipment 1, and FIG. 2 is an exploded perspective view thereof. The waveguide equipment 1 comprises a waveguide 10 on a supporting substrate 2. The supporting substrate 2 is made of silicon and has a recess. The recess has spacers 3 and 4 formed at ends of an upper face of the supporting substrate 2. A V-shaped groove 5 to position an optical fiber is formed on a top surface of the spacer 4. The waveguide 10 is disposed on a lower surface of a cover substrate 6 made of glass. The waveguide 10 comprises an upper cladding layer 7 which is disposed on the lower surface of the cover substrate 6 and is made of transparent resins such as a polymethylmethacrylate (PMMA), a core 8 which is disposed on the lower face of the upper cladding layer 7 and is made of transparent resin with the refractive index higher than that of the upper cladding layer 7, and a lower cladding layer 9 which is disposed on the upper cladding layer to surround the core 8 and is made of the same resin as the upper cladding layer 7. This waveguide 10 is disposed between the spacers 3 and 4. The end portion of the core 8 and the groove 5 is in a straight line as viewed perpendicular to the upper face of the supporting substrate 2.

As for the waveguide equipment 1, not only one piece is produced in a manufacturing process. As shown in FIG. 3, multiple pieces are produced at one time by separating. FIG. 3 is a plan view to show a gathering of several pieces of waveguide equipment before separating. FIG. 4 is a sectional view of FIG. 3 cut by X1-X1 line. A number "2A" in FIG. 4 shows a supporting mother substrate which changes to the supporting substrate 2 by separating finally. A number "6A" of FIG. 4 shows a cover mother substrate which changes to the cover substrate 6 by separating finally. For example, the cover mother substrate is made of a glass wafer. For making the gathering of several pieces of waveguide equipment shown in FIG. 3, the recess having the spacers 3 and 4, and the groove 5 for multiple pieces are formed by etching on the upper surface of the supporting mother substrate 2A. On the other hand, the upper cladding layer 7 and the core 8 for multiple pieces are disposed on the lower surface of the cover mother substrate 6A. Next, cladding resin to form the lower cladding layer 9 is poured on the upper surface of the supporting mother substrate 2A. The cover mother substrate 6A is upside down and placed on the supporting mother substrate 2A, and the cladding resin is spread out between the supporting mother substrate 2A and the cover mother substrate 6A. The resin for cladding is formed at a certain thickness by pushing the spacers 3 and 4 to the lower surface of the upper cladding layer 7. In this state, the lower cladding layer 9 is formed between the supporting mother substrate 2A and the upper cladding layer 7 cured by exposure of the resin for the cladding to UV radiation. A number "11" in FIG. 4 is a dam part to prevent the resin for the cladding from overflowing into the groove 5.

After this, each piece of waveguide equipment 1 is made by separating the gathering by dicing along the dotted line as shown in FIG. 3. The cover substrate 6 and the upper cladding layer 7 are diced at a place corresponding to an inside edge of the spacers 3 and 4, and unnecessary parts of the cover substrate 6, the upper cladding layer 7 and the lower cladding layer 9 (resin for the cladding) are removed. The waveguide equipment 1 shown in FIG. 1 and FIG. 2 is provided by dicing an edge of the supporting substrate 2 and exposing an edge of the groove 5 at the end surface of the supporting substrate 2. If the resin for the cladding has a mask at a place opposed to the spacers 3 and 4, and the UV radiation does not reach the resin for the cladding, the cover substrate 6 and the upper cladding layer 7 corresponding to the spacers 3 and 4 can be removed easily. In addition, it is also permissible to remove the dam part 11 by cutting with the dicing blade.

As a result of making the waveguide equipment 1 as described above, however, minute wrinkles and voids occur in the lower cladding layer 9. This is because the cure shrinkage rate of the resin for the cladding is large (the cure shrink rate is around 10%). FIG. 5 is a plan view to show a sample with the whole resin for the cladding cured to examine the occurrence of the wrinkles. FIG. 6 is a sectional view of FIG. 5 cut by X2-X2 line. In FIG. 5, the part with the wrinkle 12 is expressed with a bold continuous line. It is easy for the wrinkle 12 to occur around spacers 3 and 4. In addition, a void also occurs with the wrinkle 12. When such wrinkle 12 and void occur, an appearance failure occurs to the waveguide equipment 1. Even more particularly, the upper cladding layer 7 and the core 8 is deformed by the residual stress, and there are problems due to the leakage of the optical signal propagating in the core 8 and a decrease of the optical signal propagation efficiency.

In addition, as shown in FIG. 7, when exfoliation 13 occurs between the upper cladding layer 7 and the core 8 by the cure shrinkage of the lower cladding layer 9, the waveguide equipment 1 becomes bad. Even more particularly, it becomes clear that the wrinkle 12 and the exfoliation 13 occur easier when the difference of height between the top surface of spacers 3 and 4, and the inner bottom surface of the recess is larger.

A resin with small cure shrinkage rate should be used to prevent such a characteristic deterioration. However, resin with small cure shrinkage rate is so expensive that the cost of the waveguide equipment 1 becomes high and the width of the resinous section becomes small. Therefore, an approach to prevent the characteristic deterioration by cure shrinkage without depending on a resinous kind is expected.

SUMMARY OF INVENTION

Embodiments of the present invention prevent the wrinkle by cure shrinkage of the cladding layer from occurring, and decrease the characteristic deterioration and the appearance failure in waveguide equipment.

In accordance with an aspect of the present invention, waveguide equipment comprises a first substrate, an upper cladding layer disposed on the first substrate, a core disposed on the upper cladding, a lower cladding layer disposed on the upper cladding layer to surround the core, and a second substrate having a spacer to support the upper cladding layer and a recess to receive the lower cladding layer, wherein the recess of the second substrate has an intermediate surface and the height of the intermediate surface is selected to be positioned between an inner bottom surface of the recess and an top surface of the spacer.

In accordance with an aspect of the present invention, a method of manufacturing waveguide equipment comprises forming an upper cladding layer on a first substrate, forming a core on the upper cladding layer, forming a second substrate, wherein the second substrate has a spacer and a recess having an intermediate surface positioned between an inner bottom surface of the recess and an top surface of the spacer, applying resin on the second substrate, placing the upper cladding layer formed on the first substrate on the second substrate so as to be supported by the spacer, and forming a lower cladding layer by curing the resin.

For waveguide equipment in accordance with one or more embodiments of the present invention, the thickness of the lower cladding layer becomes precise to be supported the upper cladding layer with the spacer. In addition, each of the difference of the height between the top surface of the spacer and the intermediate surface, the difference of the height between the intermediate surfaces, and the difference of the height between the intermediate surface and the inner bottom surface of the recess of the second substrate becomes thinner than the total thickness of the lower cladding layer. Thus, when the resin for the lower cladding layer is cured to shrinkage, the inner stress in the resin disperses and the occurrence of the wrinkle and the void decreases. The appearance failure and the characteristic deterioration in the waveguide equipment are prevented.

As much as possible, the above mentioned constituent elements of the present invention can be combined arbitrarily. Other aspects and advantages of the invention will be apparent from the following description and the appended claims.

DETAILED DESCRIPTION

Specific embodiments of the present invention are explained in detail below with reference to the figures. These embodiments are merely examples and the present invention is not limited to the specific embodiments explained below.

Figure 8:
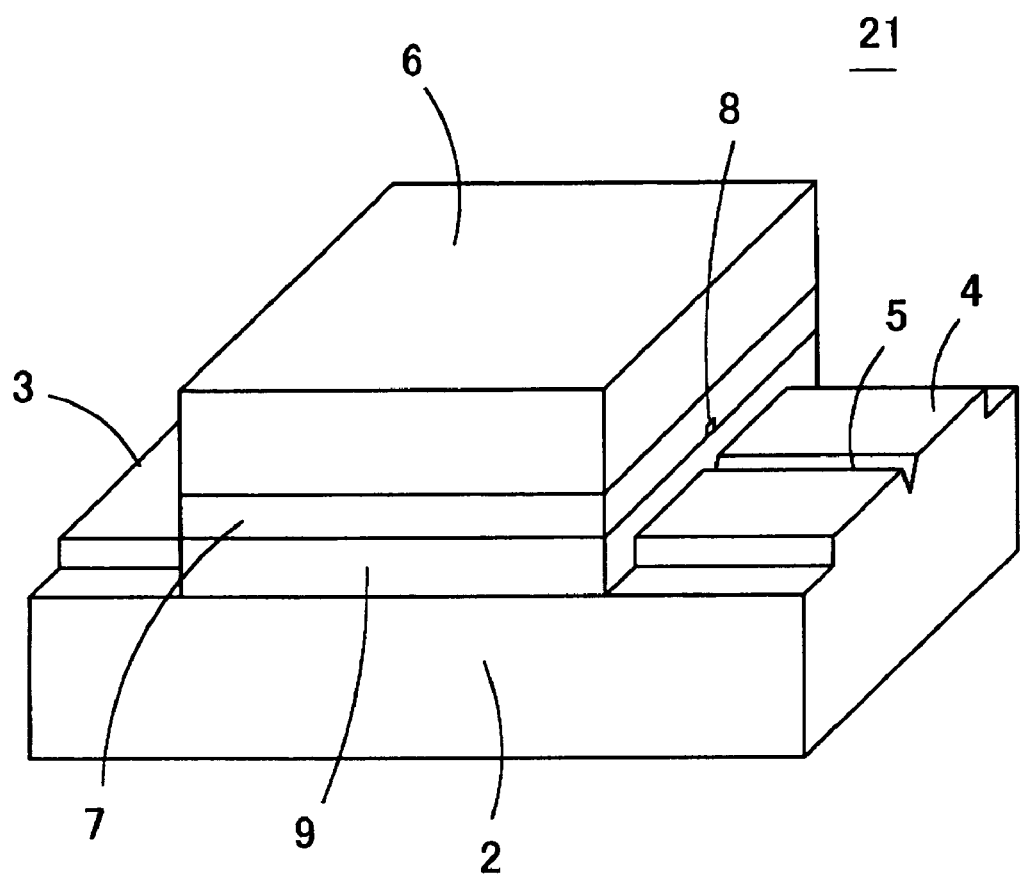
FIG. 8 is a perspective view showing waveguide equipment in accordance with one embodiment of the present invention.
Figure 9:
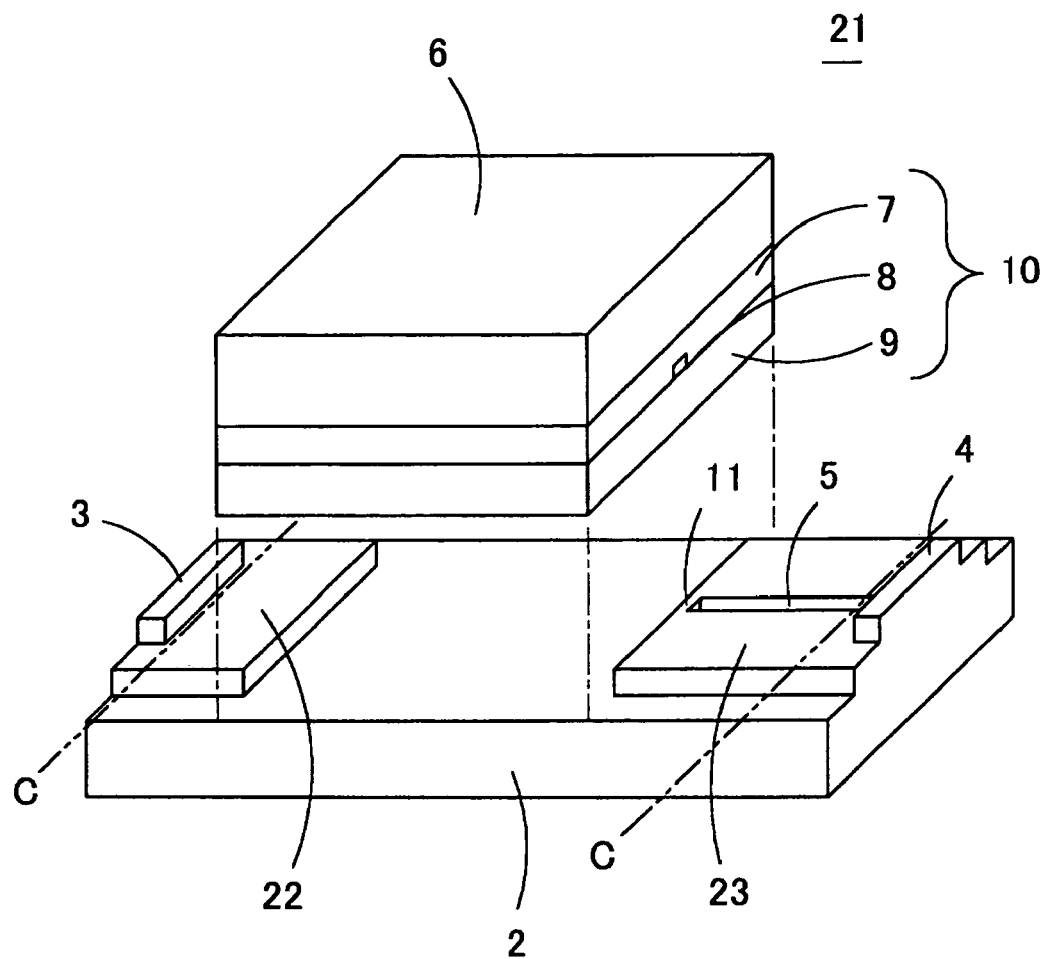
FIG. 9 is an exploded perspective view showing waveguide equipment in accordance with one embodiment of the present invention.
Figure 10:
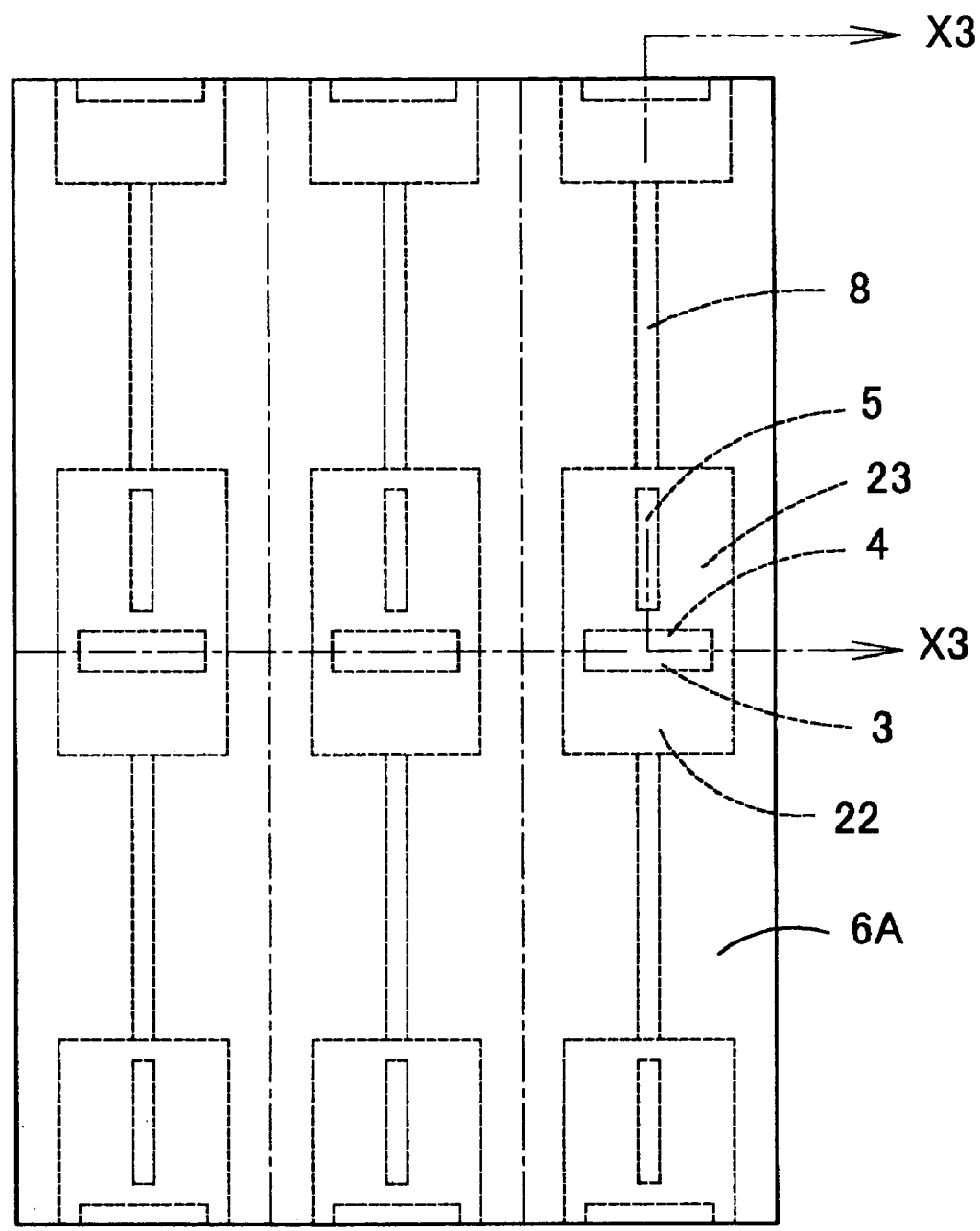
FIG. 10 is a plan view showing gathering of several pieces of waveguide equipment in accordance with one embodiment of the present invention before separating.
Figure 11:
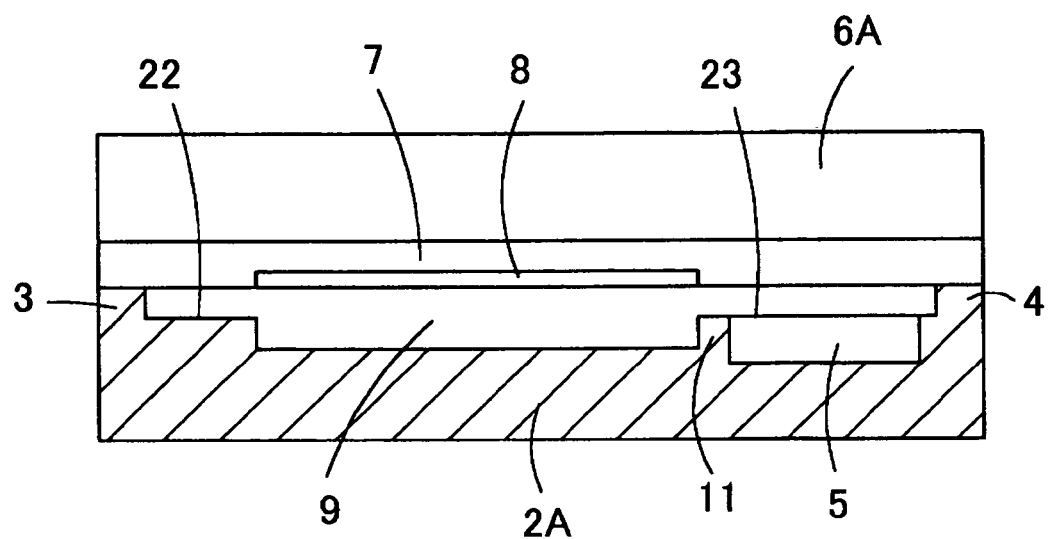
FIG. 11 is a sectional view of FIG. 10 cut by X3-X3 line.

FIG. 8 is a perspective view showing waveguide equipment 21 in accordance with one embodiment of the present invention. FIG. 9 is an exploded perspective view showing the waveguide equipment 21 which is one step before the finished product. FIG. 10 is a plan view showing a gathering of the waveguide equipment 21 in a manufacturing process. FIG. 11 is a sectional view of FIG. 10 cut by X3-X3 line. The waveguide equipment 21 of this embodiment has the same structure and is produced by the same process as the waveguide equipment 1 shown in FIG. 1 to FIG. 4. The parts which are the same are not explained in detail below . The description of such parts is omitted and such parts have the same numbers in the drawings as numbers in the waveguide equipment 1 explained in FIG. 1 to FIG. 4.

The waveguide equipment 21 of the embodiment shown in FIG. 9 is one step before the final process. Area of the spacers 3 and 4 is small and intermediate surfaces 22 and 23 are formed around the spacers 3 and 4. The height of the intermediate surfaces 22 and 23 is lower than the top surface of the spacers 3 and 4, and is higher than the inner bottom surface of the recess of a supporting substrate 2. A V-shaped groove 5 is formed on the intermediate surface 23. The area of the top surface of the spacer is preferably smaller to prevent the wrinkle from occurring. It is preferable to be less than 10% of that of the supporting substrate 2 within the limits the necessary strength of the spacers 3 and 4. The difference of the height between the intermediate surfaces 22 and 23 and the inner surface of the supporting substrate 2 is preferably less than 20 μm, and the difference of the height between the intermediate surfaces 22 and 23 and the top surface of the spacer 3 and 4 is also preferably less than 20 μm. Furthermore, the length between the two boundaries, one boundary is between the intermediate surfaces 22 and 23 and the inner surface of the supporting substrate 2 and another boundary is between the intermediate surfaces 22 and 23 and the top surface of the spacer 3 and 4, is preferably far to prevent the wrinkle from occurring. The length of horizontal direction (a direction parallel to a core 8) in the intermediate surfaces 22 and 23 is preferably more than 300 μm. The waveguide 10 disposed on a lower face of a cover substrate 6 is disposed on an upper face of the supporting substrate 2.

In a final process, a dam part 11 of the supporting substrate 2 is removed by cutting at an end surface of the intermediate surface 23 and an end portion of the supporting substrate 2 is cut off along the C line shown in FIG. 9 to open an end of the groove 5 by a dicing saw. Thus, the waveguide equipment 22 shown in FIG. 8 is provided.

The waveguide equipment 21 is produced as shown in FIG. 10 and FIG. 11. The intermediate surfaces 22 and 23 are formed as one part on an upper face of a supporting mother substrate 2A made of silicon wafer. The spacer 3 and 4 is projected as one part on each surface of the intermediate surfaces 22 and 23. An ultraviolet light curing type resin for the cladding is poured on the supporting mother substrate 2A, the resin is pressed by an upper cladding layer 7 and the core 8 disposed on a lower face of a cover mother substrate 6A and is spread out between the supporting mother substrate 2A and the upper cladding layer 7. The resin for the cladding is formed at a certain thickness by pushing the spacers 3 and 4 to the lower surface of the upper cladding layer 7. In this state, the lower cladding layer 9 is formed by causing the resin for the cladding to cure by exposure to the UV radiation through the cover mother substrate 6A. The resin for the cladding has a mask at a place opposed to the spacers 3 and 4 and the intermediate surfaces 22 and 23, so that the UV radiation does not reach the resin for the cladding.

After lower cladding layer 9 is formed by curing the resin, each piece of waveguide equipment 21 is made by separating the gathering by dicing along dotted line as shown in FIG. 10. The cover substrate 6, the upper cladding layer 7 and the supporting substrate 2 are diced at a place corresponding to an inside edge of the spacers 3 and 4, and unnecessary parts of the cover substrate 6, the upper cladding layer 7 and the supporting substrate 2 are removed. The intermediate surfaces 22 and 23 are exposed and the waveguide equipment 21 shown in FIG. 9 is provided.

Figure 1:
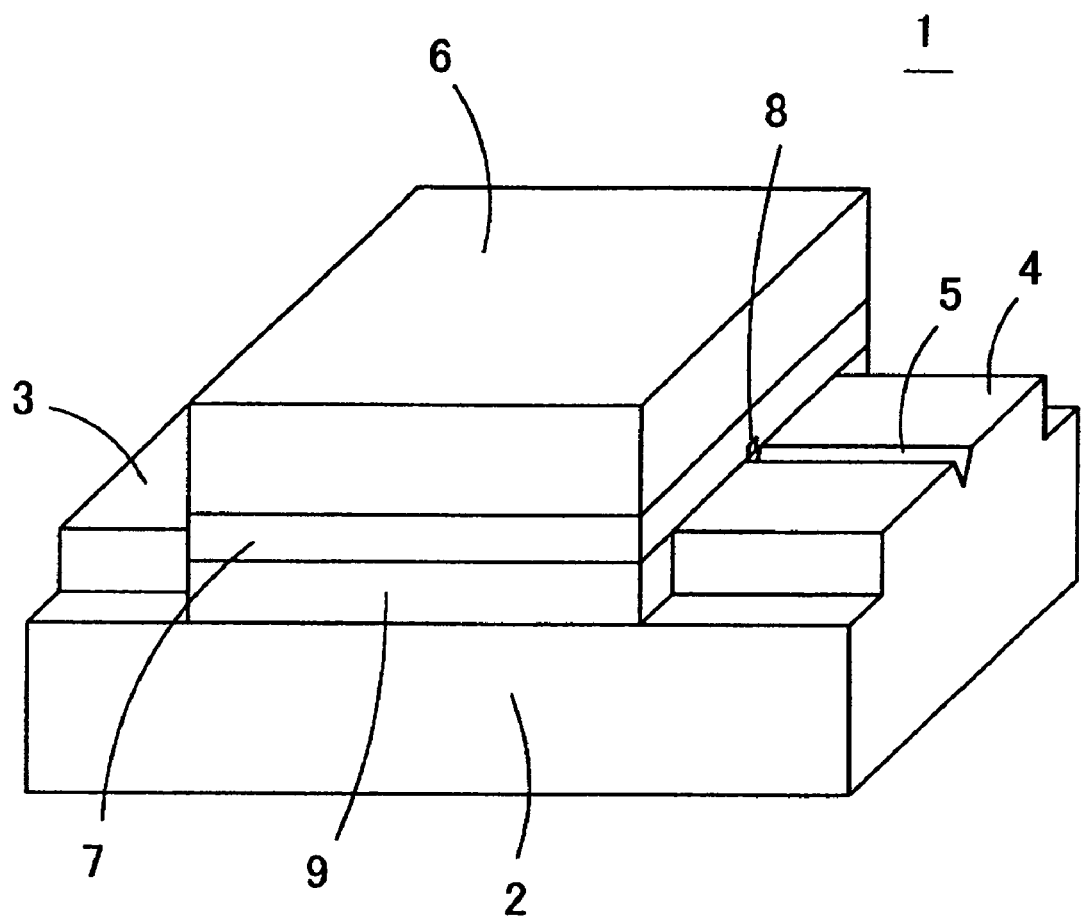
FIG. 1 is a perspective view showing waveguide equipment of the prior art.
Figure 2:
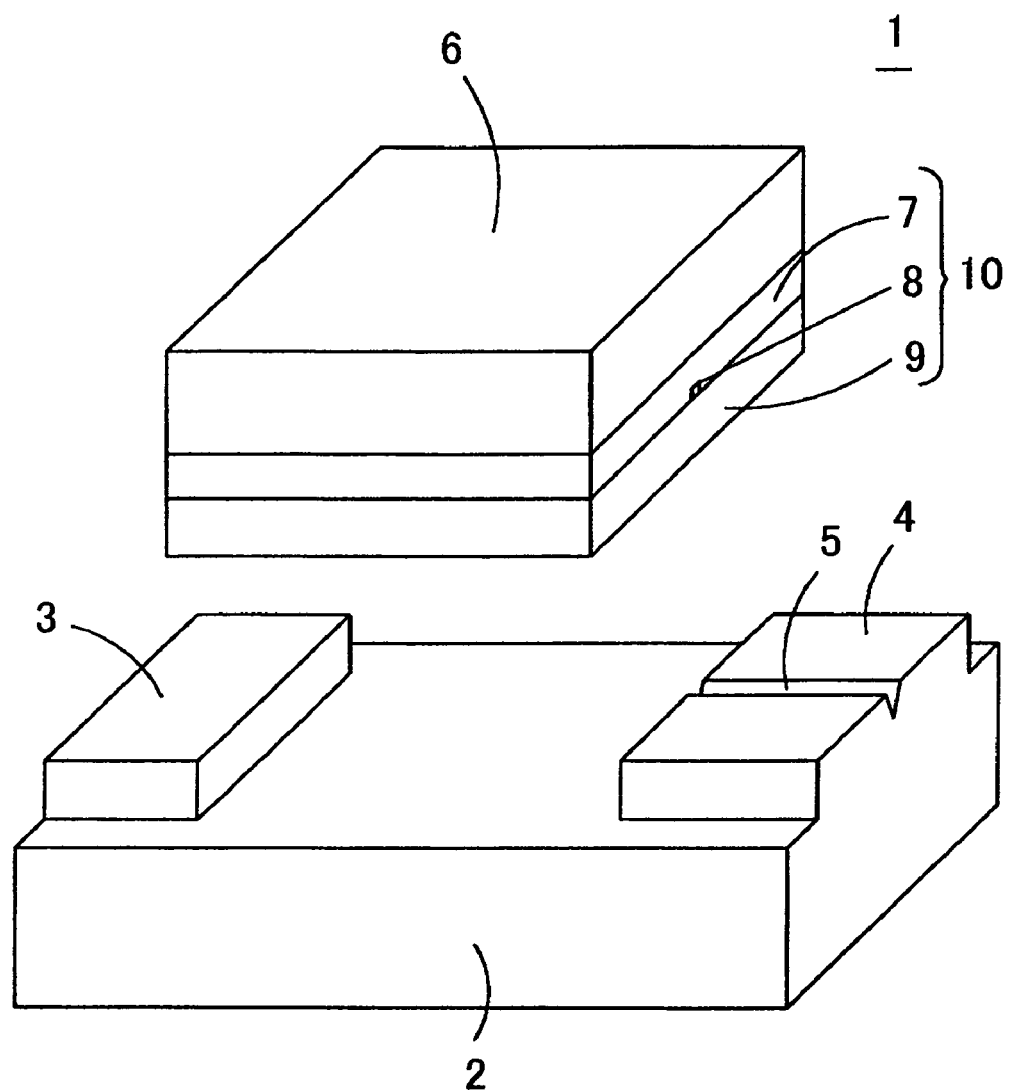
FIG. 2 is an exploded perspective view of the waveguide equipment shown in FIG. 1.
Figure 3:
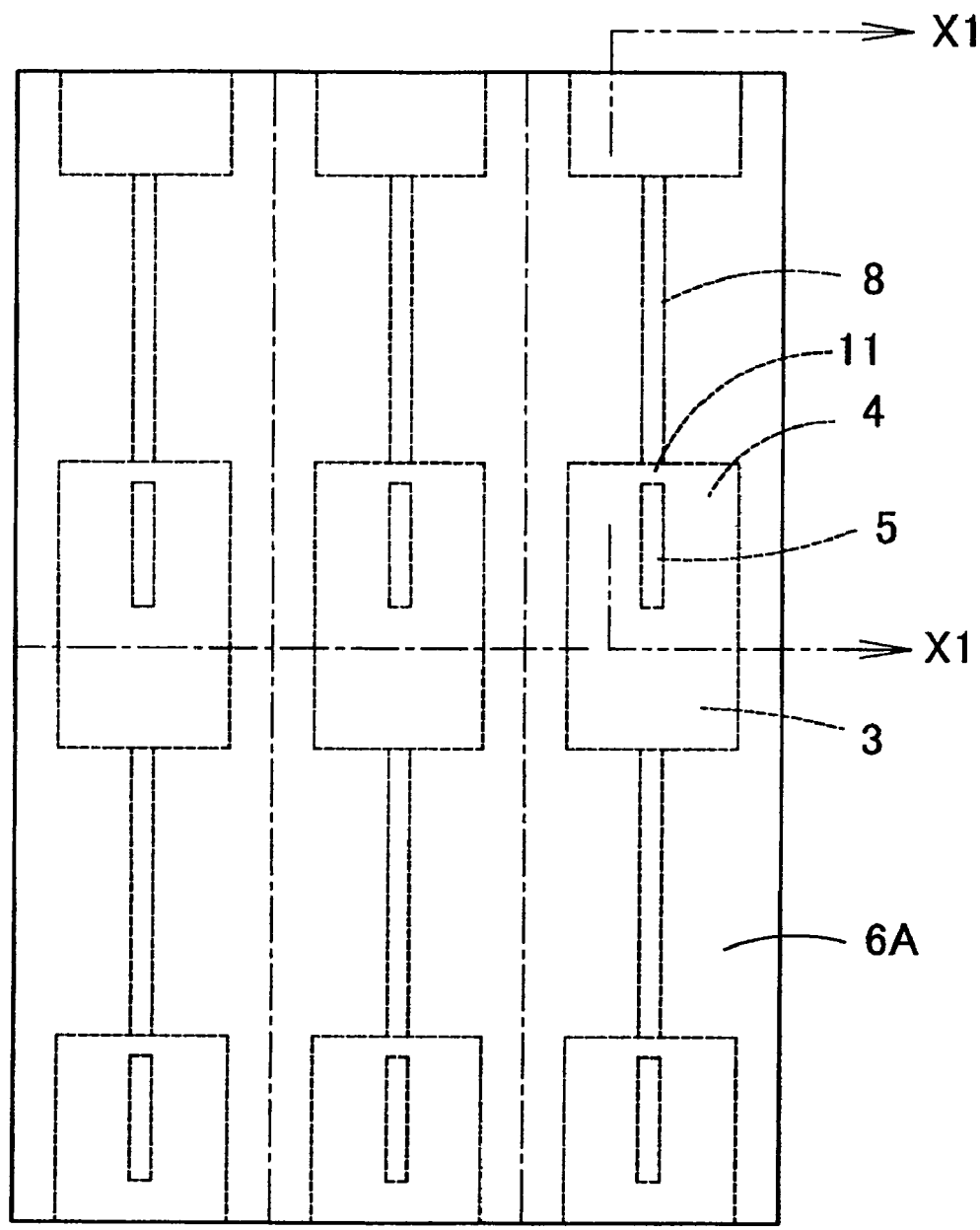
FIG. 3 is a plan view showing gathering of several pieces of waveguide equipment of the prior art before separating.
Figure 4:
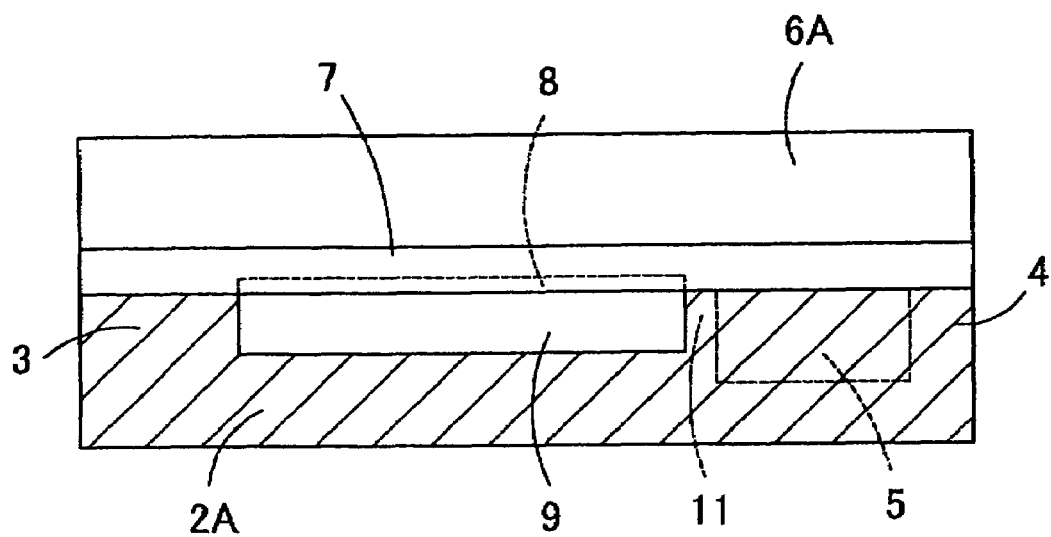
FIG. 4 is a sectional view of FIG. 3 cut by X1-X1 line.
Figure 5:
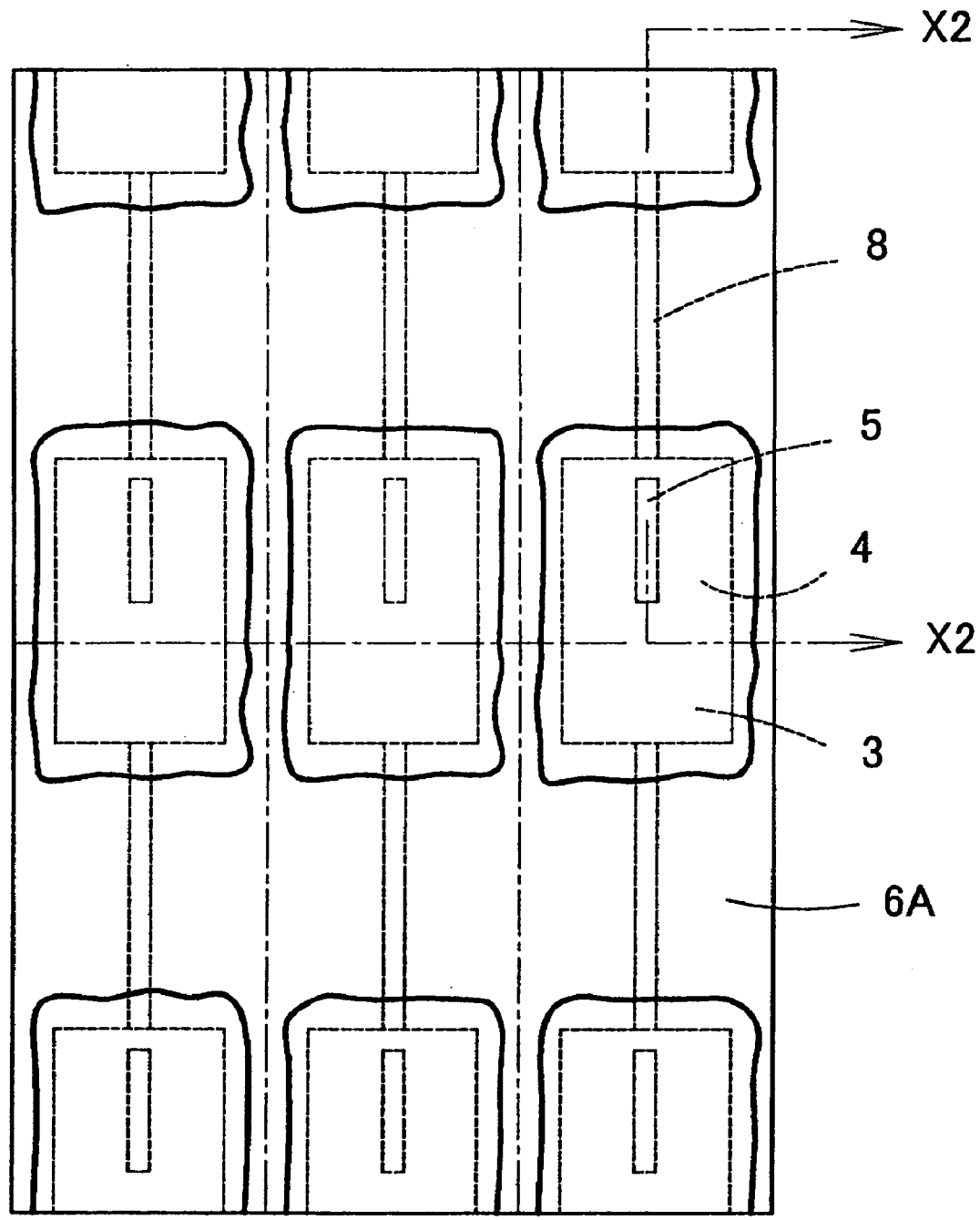
FIG. 5 is a plan view showing gathering of several pieces of waveguide equipment of the prior art before separating.
Figure 6:
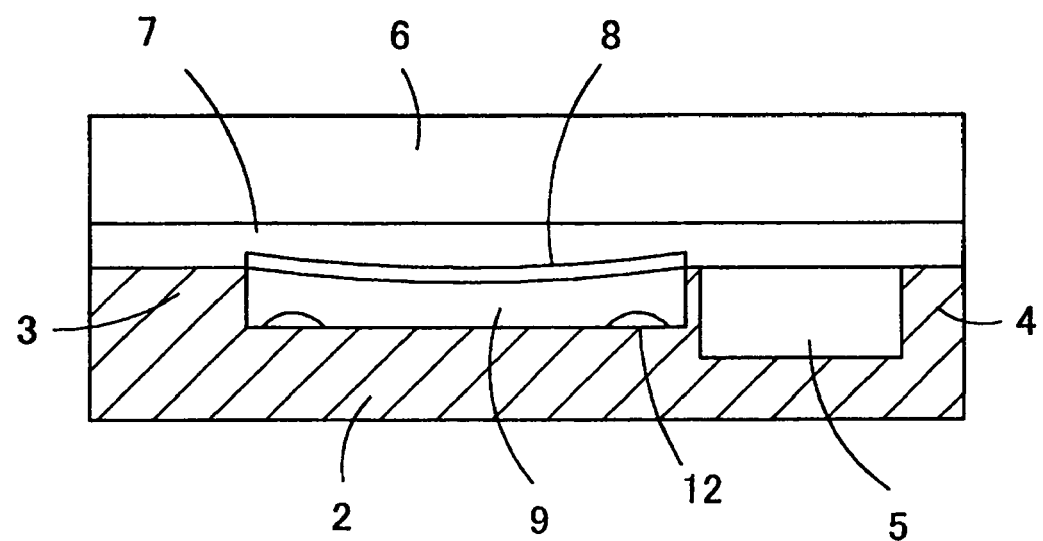
FIG. 6 is a sectional view of FIG. 5 cut by X2-X2 line.
Figure 7:
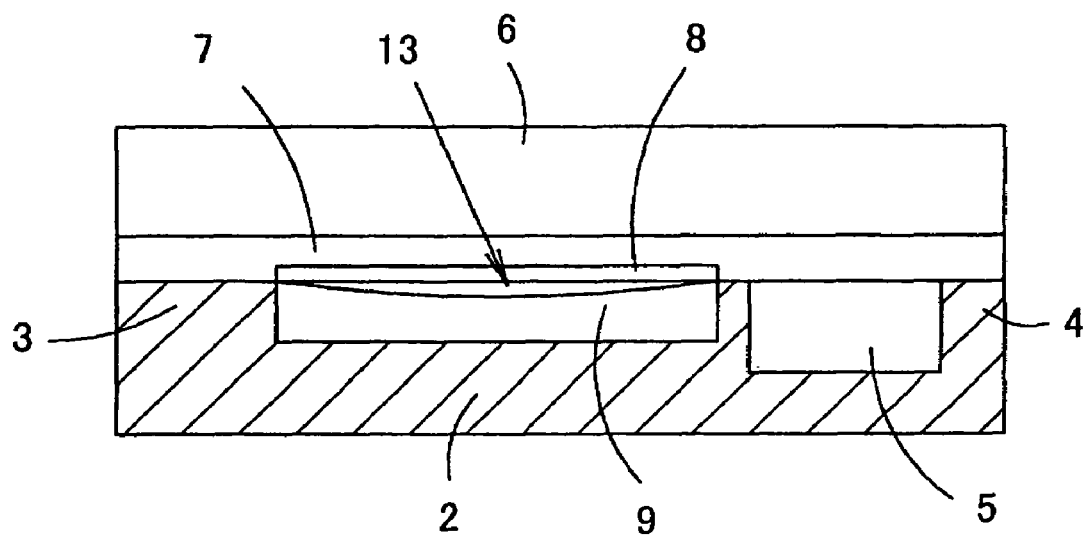
FIG. 7 is a sectional view of FIG. 5 cut by X2-X2 line.

The waveguide equipment 21 in FIG. 11 is compared with the waveguide equipment 1 in FIG. 4. The difference of the height between the top surface of the spacers 3 and 4 and the inner surface of the supporting substrate 2 in the waveguide equipment 1 is large, and the large inner stress occurs because the cure shrinkage stress of the resin for the cladding gathers in the boundary between the top surface of the spacers 3 and 4 and the inner surface of the supporting substrate 2. In the waveguide equipment 21, the difference of the height between the top surface of the spacers 3 and 4 and the inner surface of the supporting substrate 2 is separated into two parts by the intermediate surfaces 22 and 23 and each difference of the height is small. The cure shrinkage stress of the resin for the cladding does not gather and is dispersed in the two boundaries. Thus, in the waveguide 21, it is difficult for the lower cladding layer 9 to form the wrinkle and the void and for the boundary between the upper cladding layer 7 and the lower cladding layer 9 to form the exfoliation.

Figure 12:
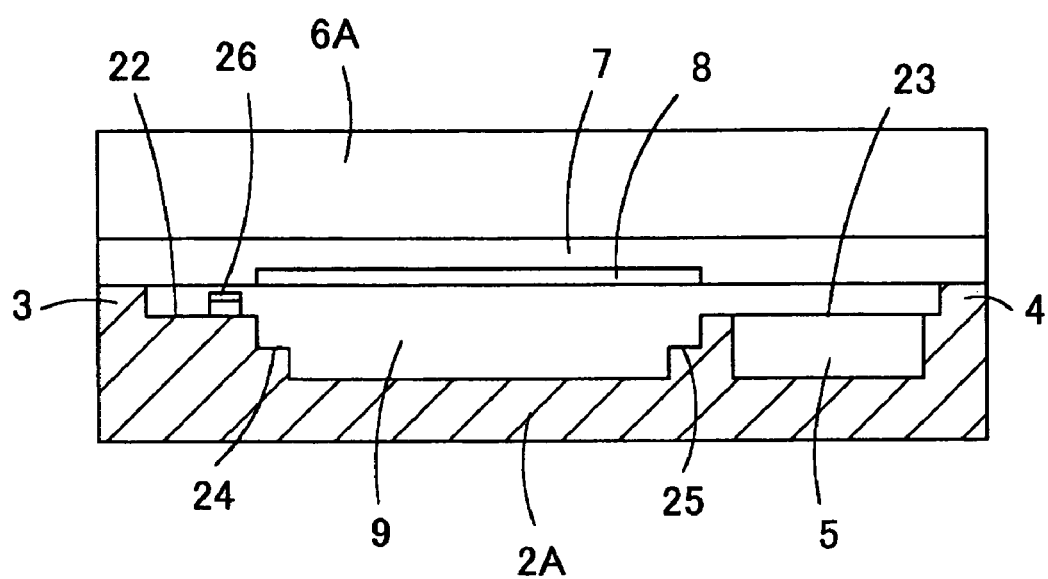
FIG. 12 is a sectional view showing waveguide equipment in accordance with one embodiment of the present invention.

According to an experiment, it is easy for the wrinkle to occur when the difference of the height is more than 20 μm. The difference of the height at each boundary is preferably less than 20 μm described above. However, when the lower cladding layer 9 is thin, the optical signal that propagates in the core 8 can easily leak. Thus, when the thickness of the lower cladding layer 9 is more than 40 μm, the difference of the height at each boundary is preferably less than 20 μm by making three steps as shown in FIG. 12. By an embodiment shown in FIG. 12, the intermediate surfaces 24 and 25 are formed below the end part of the core 8. Thus, the stress concentration in the end part of the core 8 can be eased.

Figure 13:
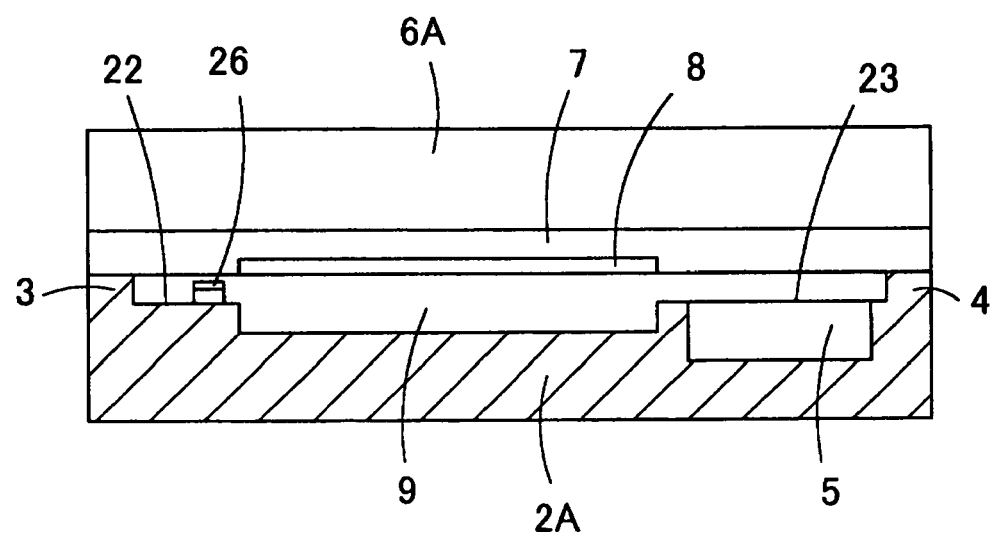
FIG. 13 is a sectional view showing waveguide equipment in accordance with one embodiment of the present invention.

FIG. 13 shows a modified version of this embodiment. A metal pattern 26 is disposed on the intermediate surface 22 of the supporting mother substrate 2A before placing the cover mother substrate 6A in this modified embodiment. This metal pattern 26 is a mounting pad to mount a light projection device, a photo detector, etc. When the metal pattern 26 is disposed, it is easy for the wrinkle for the cladding layer 9 to occur. According to this modified embodiment, however, the occurrance of the wrinkle and the void is prevented because the intermediate surfaces 22 and 23 are formed and the stress concentration is eased at the boundaries. When the metal pattern 26 is disposed on the intermediate surface 22, the number of steps is increased more than three steps shown in FIG. 12. Thus, the height of the metal pattern 26 can be changed easily.

Figure 14:
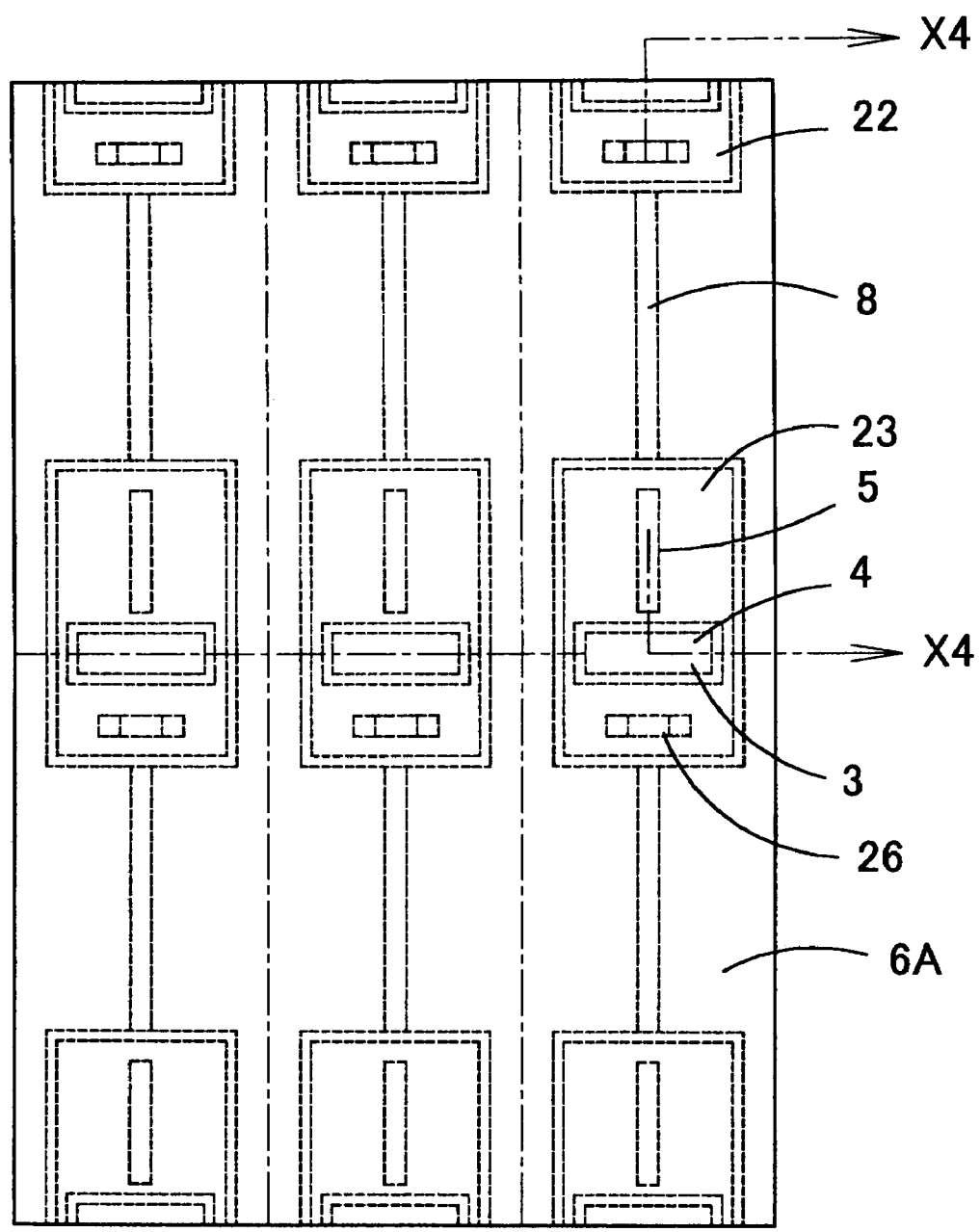
FIG. 14 is a plan view showing gathering of several pieces of waveguide equipment in accordance with one embodiment of the present invention before separating.
Figure 15:
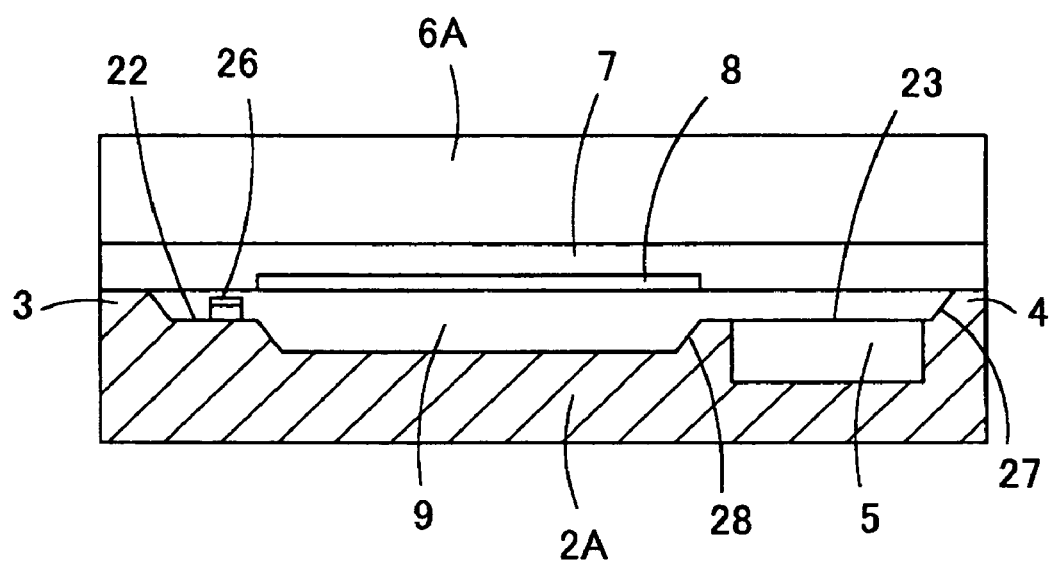
FIG. 15 is a sectional view of FIG. 14 cut by X4-X4 line.

FIG. 14 is a plan view showing a modified version of this embodiment. FIG. 15 is a sectional view of FIG. 14 cut by X4-X4 line. In this modified embodiment, an inclined surface 27 is formed between the spacers 3 and 4 and the intermediate surfaces 22 and 23, and an inclined surface 28 is formed between the intermediate surfaces 22 and 23 and the inner bottom surface of the supporting mother substrate 2A. The angles of these inclined surfaces 27 and 28 are preferably less than 55°. For example, when a [100] silicon substrates are used for the supporting mother substrate 2A, the angle of the inclined surfaces 27 and 28 can be formed at 54° by etching. It is permissible to form the inclined surface only to a part of steps. It is also permissible to form a curved surface, such as an arc-shaped face, as the inclined surface.

Figure 16:
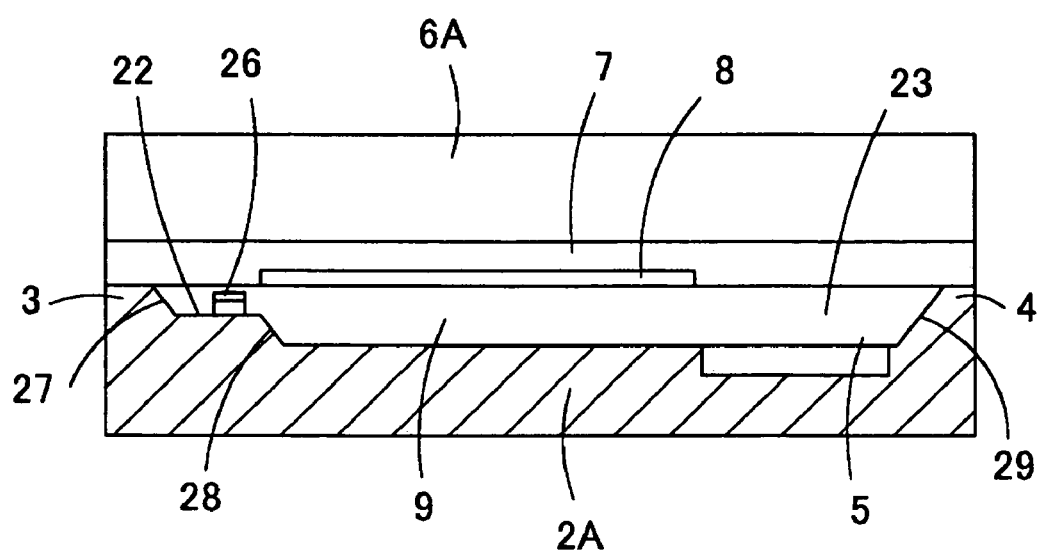
FIG. 16 is a sectional view showing waveguide equipment in accordance with one embodiment of the present invention.

As for the inclined surface, the height of the lower cladding layer 9 changes gradually and the stress is dispersed. Thus, when the inclined surface 29 shown in FIG. 16 is formed, the intermediate surface is not needed even if the difference of the height is large.

Figure 17:
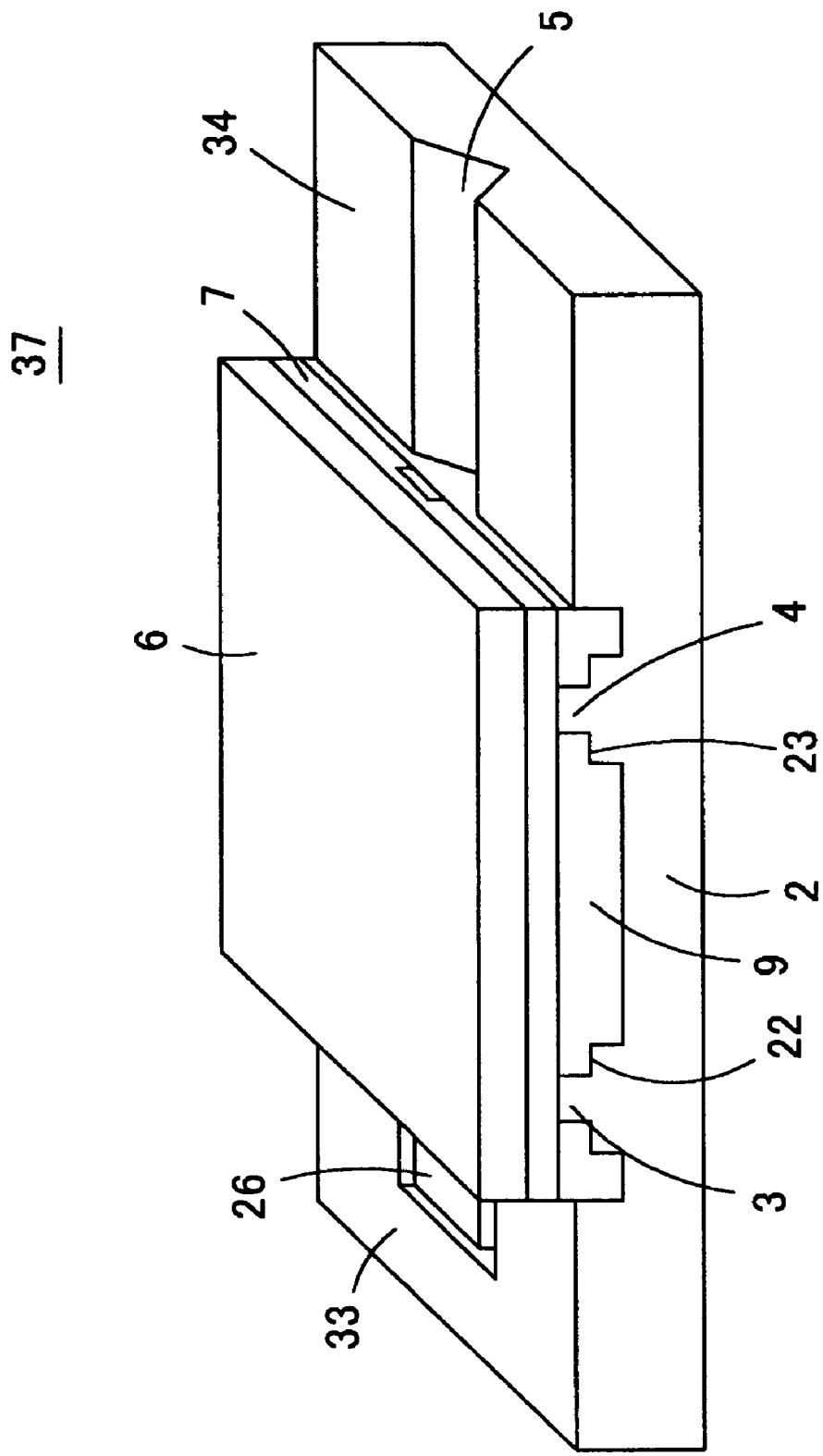
FIG. 17 is a perspective view showing waveguide equipment in accordance with one embodiment of the present invention.
Figure 18:
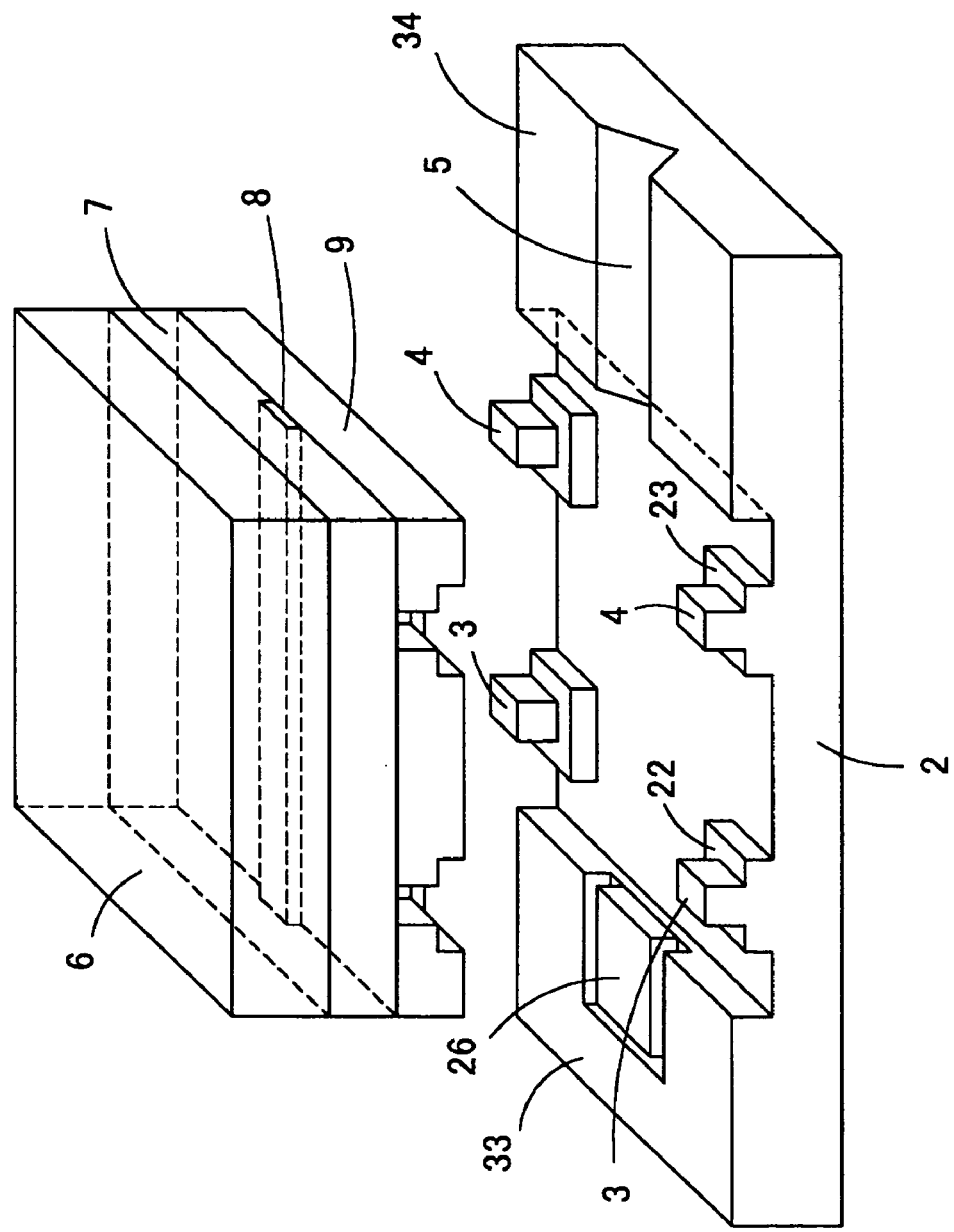
FIG. 18 is an exploded perspective view of the waveguide equipment shown in FIG. 17.

In the embodiments described above, the spacer was removed in the final process. However, the spacers may be left. FIG. 17 is a perspective view showing waveguide equipment 37 in accordance with one embodiment of the present invention. FIG. 18 is a partly exploded perspective view of the waveguide equipment 37. In this embodiment, the plurality of spacers 3 and 4 are formed like projections, and the intermediate surface 22 and 23 lower than the spacers 3 and 4 are formed circumferentially.

In this embodiment, the stress is dispersed when the resin for lower cladding layer 9 cures. Thus, the occurrence of the wrinkle can be prevented. The spacers 3 and 4 and the intermediate surfaces 22 and 23 are left in the waveguide equipment 37 because the spacers 3 and 4 and the intermediate surfaces 22 and 23 are formed in the lower cladding layer.

Figure 19:
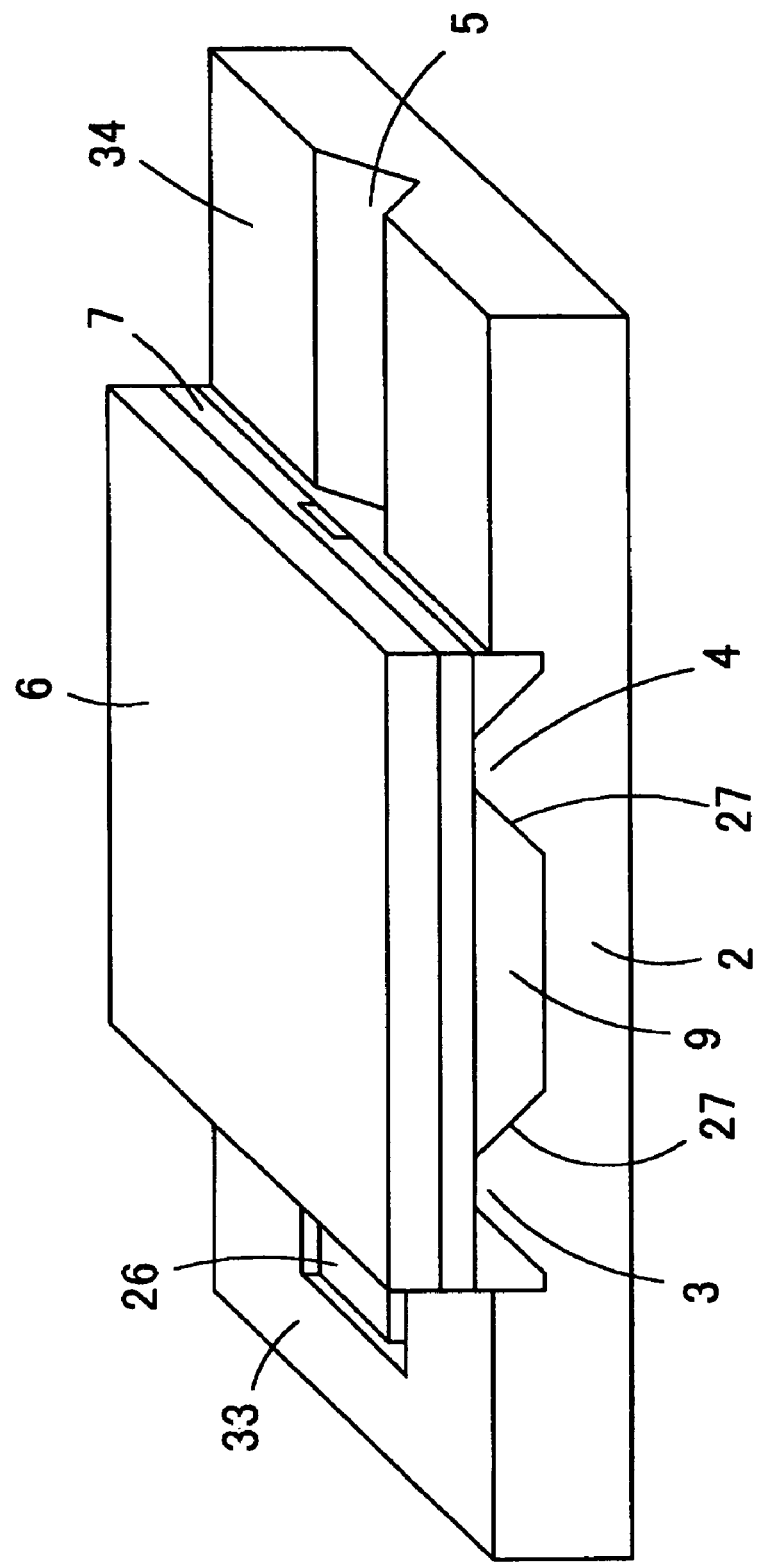
FIG. 19 is a perspective view showing waveguide equipment in accordance with one embodiment of the present invention.
Figure 20:
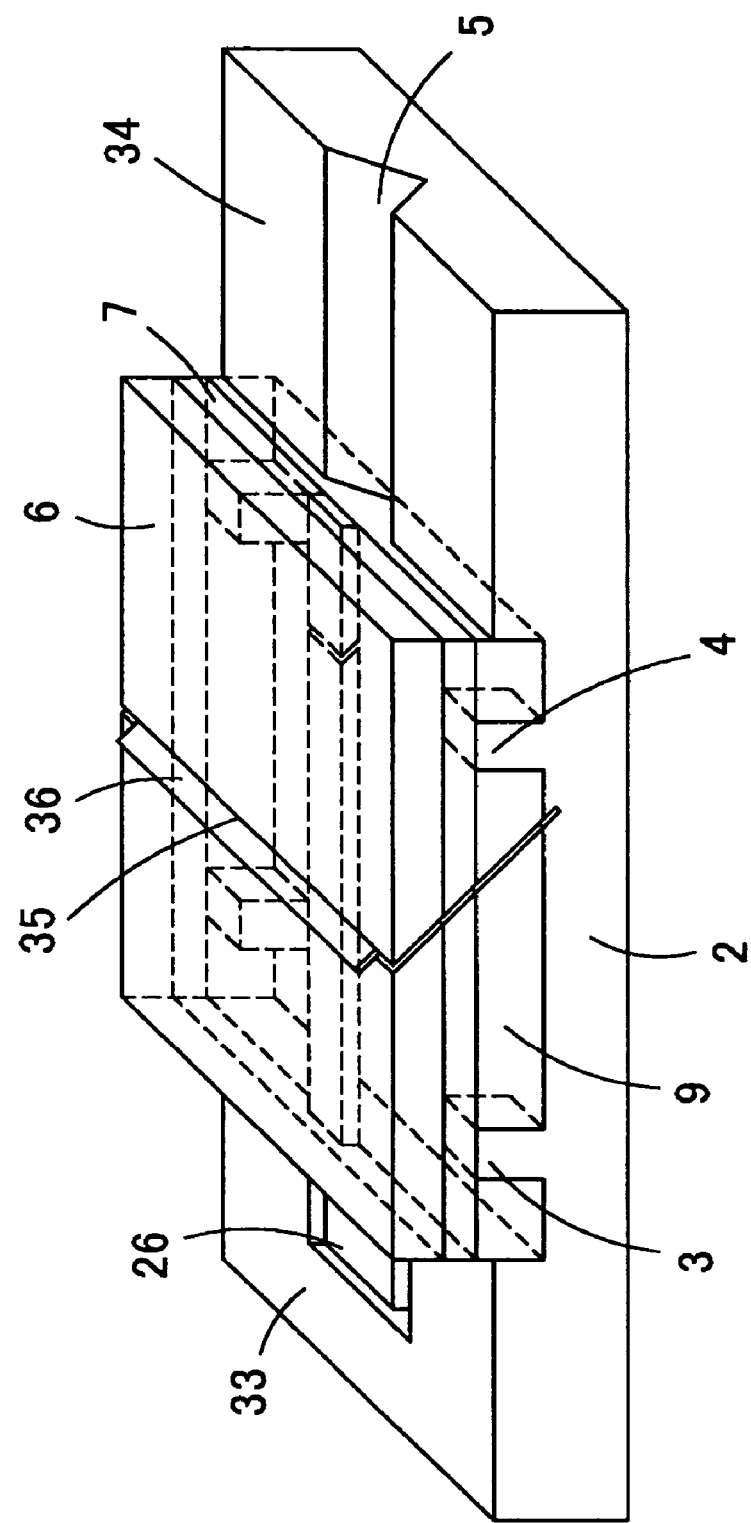
FIG. 20 is an exploded perspective view of the waveguide equipment shown in FIG. 19.

FIG. 19 shows an embodiment that the spacers 3 and 4 having the inclined surface 27 are formed in the lower cladding layer 9. FIG. 20 is an exploded perspective view of the waveguide equipment shown in FIG. 19. The angles of these inclined surfaces 27 are preferably less than 55°.

In this embodiment, the stress is dispersed when the resin for lower cladding layer 9 cures. Thus, the occurrence of the wrinkle can be prevented. The spacers 3 and 4 are left in the waveguide equipment because the spacers 3 and 4 is formed in the lower cladding layer.

Figure 21:
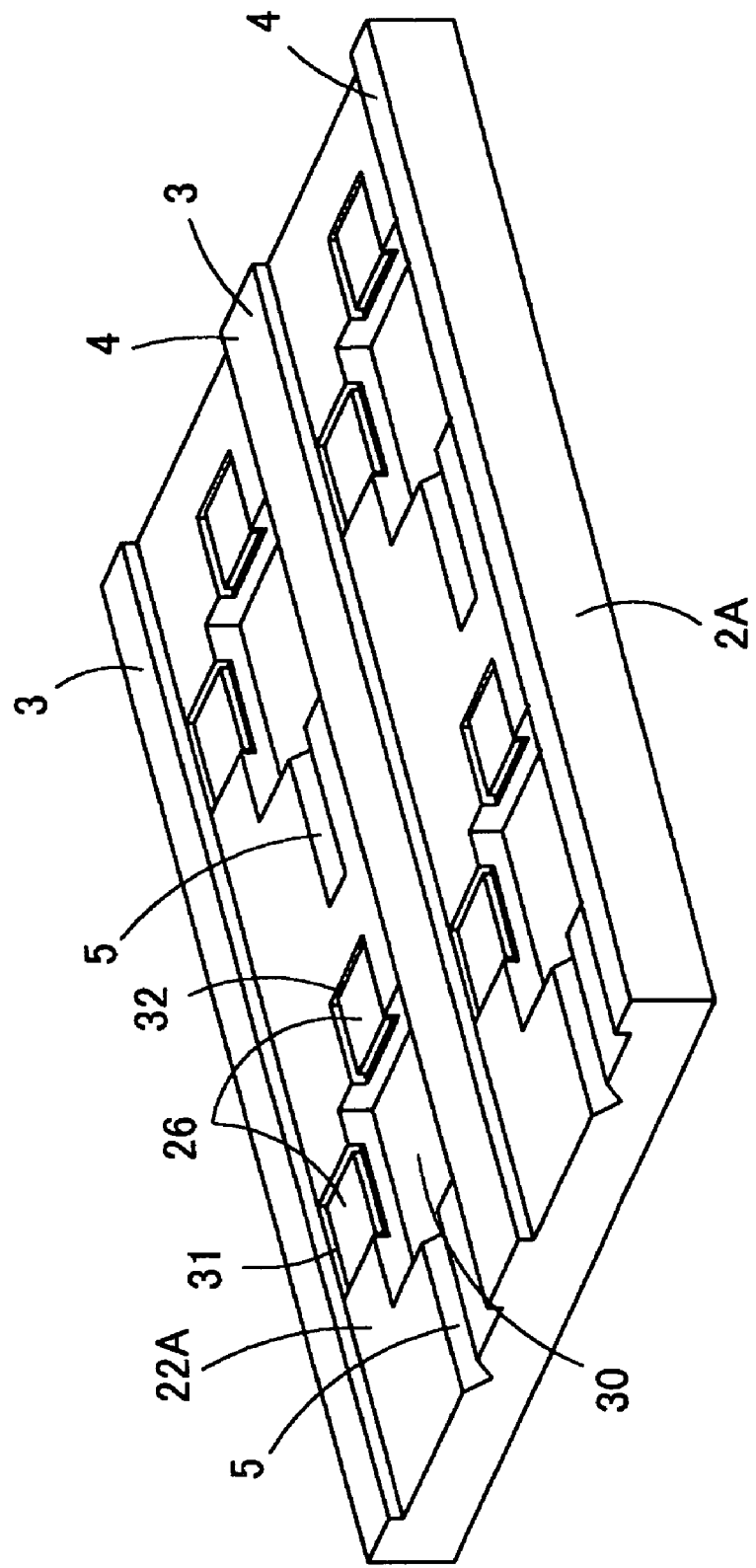
FIG. 21 is a perspective view showing a supporting substrate in accordance with one embodiment of the present invention.

In the embodiments described above, the spacers 3 and 4, the intermediate surfaces 22, 23, 24 and 25 were disposed in a straight line. However, these elements can be disposed arbitrarily. FIG. 21 is a perspective view showing the supporting mother substrate 2A in such an embodiment.

In this embodiment, the striped spacers 3 and 4 are formed on both ends of a widthwise direction of the waveguide equipment as the groove 5 is sandwiched. The intermediate surface 22A lower than the top surface of the spacers 3 and 4 is formed on the whole region between the spacer 3 and the spacer 4. Recess 30 is formed as connecting with the end of the groove 5 to dispose the lower cladding layer 9. Metal mounting surfaces 31 and 32 are formed as connecting with two adjacent sides of the recess 30. Metal patterns 26 are disposed on the metal mounting surfaces 31 and 32. In this embodiment, the spacers 3 and 4 and the intermediate surface 22A are formed to be disposed with 2 dimensions so that the difference of the height at the boundary is small. In the following process, the cover mother substrate is placed on the supporting mother substrate 2A, the lower cladding layer is formed between the two mother substrate, and each piece of waveguide equipment is produced by dicing the gathering of several pieces of waveguide equipment and making the groove and the metal pattern 26 exposure. It is permissible for the spacers 3 and 4 to be left in this waveguide equipment.

Figure 22:
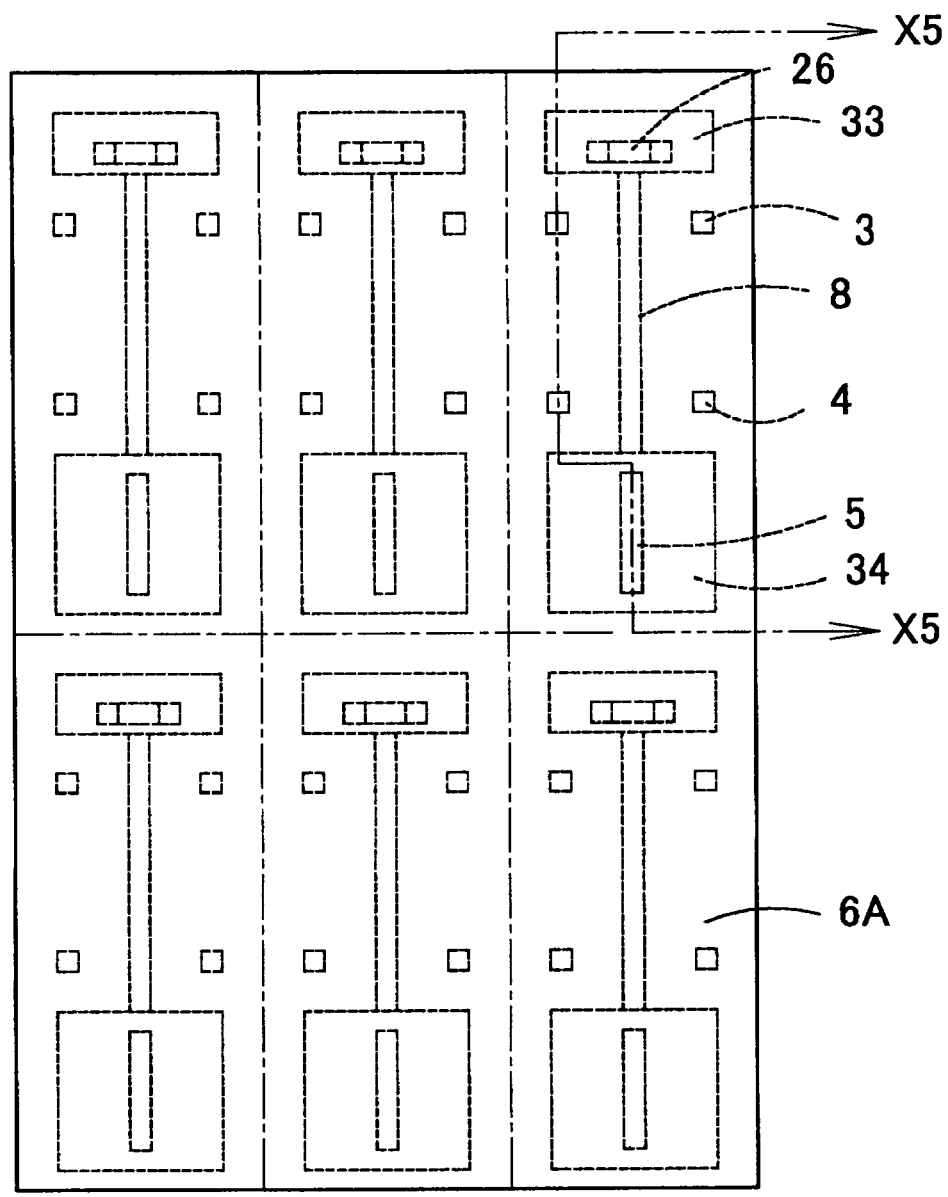
FIG. 22 is a plan view showing gathering of several pieces of waveguide equipment in accordance with one embodiment of the present invention before separating.
Figure 23:
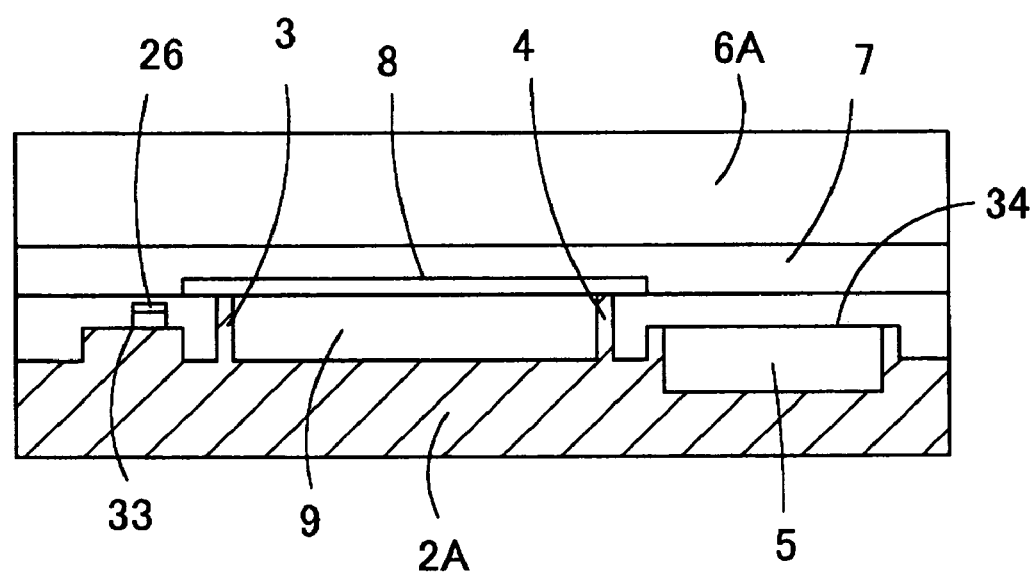
FIG. 23 is a sectional view of FIG. 22 cut by X5-X5 line.
Figure 24:
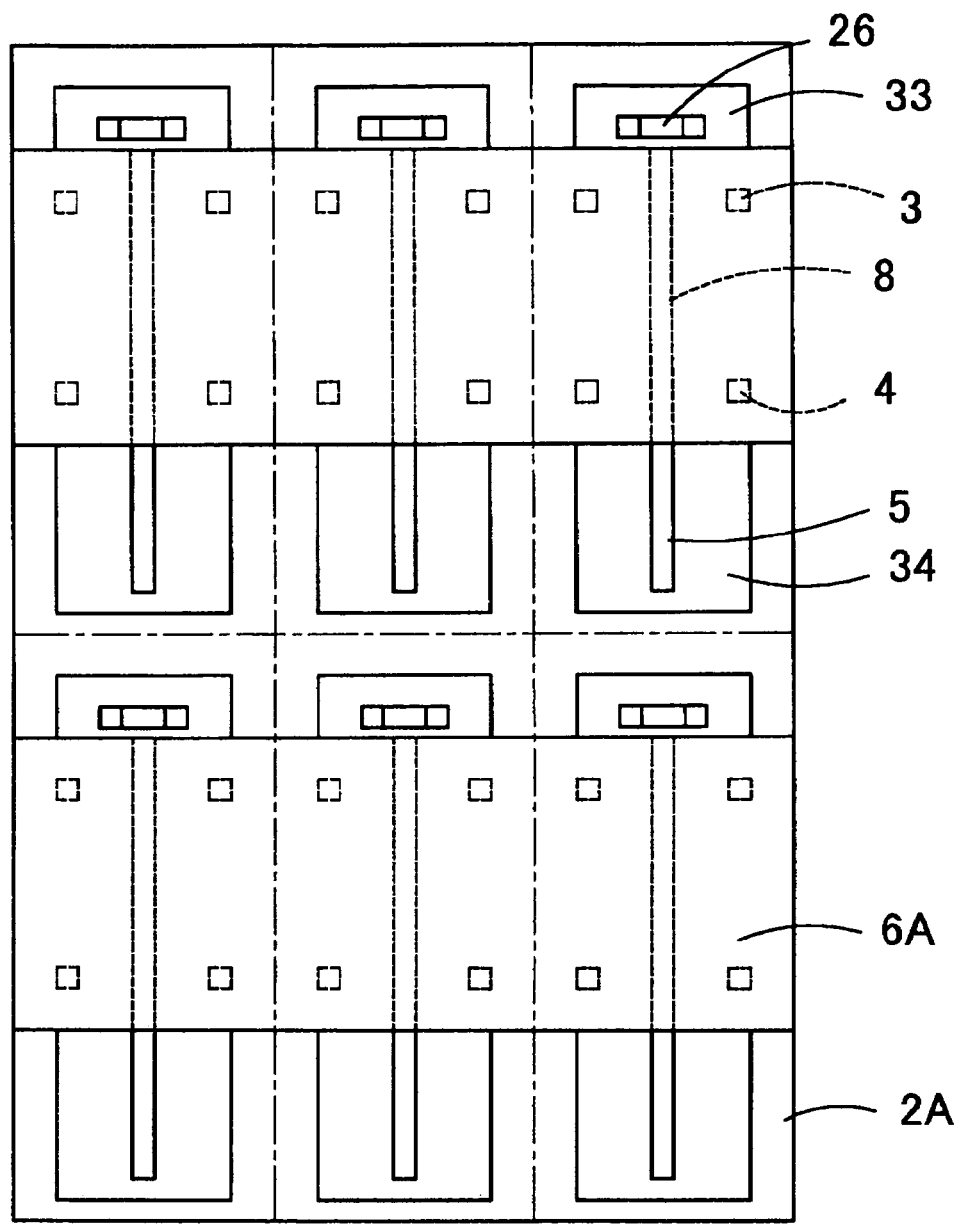
FIG. 24 is a plan view showing gathering of several waveguide equipment in accordance with one embodiment of the present invention before separating.
Figure 25:
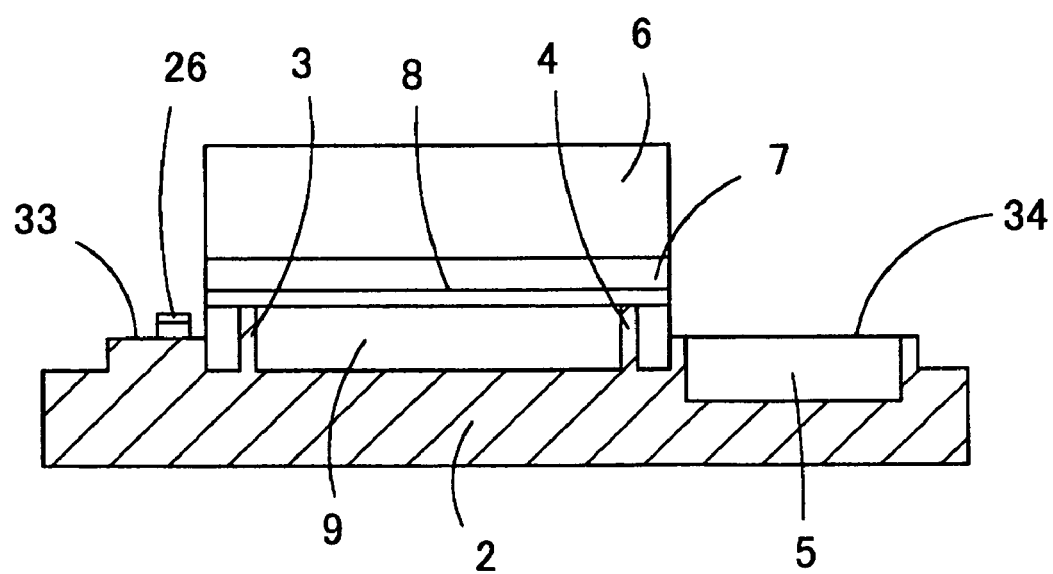
FIG. 25 is a sectional view showing one of the gathering of the several pieces of waveguide equipment shown in FIG. 24.
Figure 26:
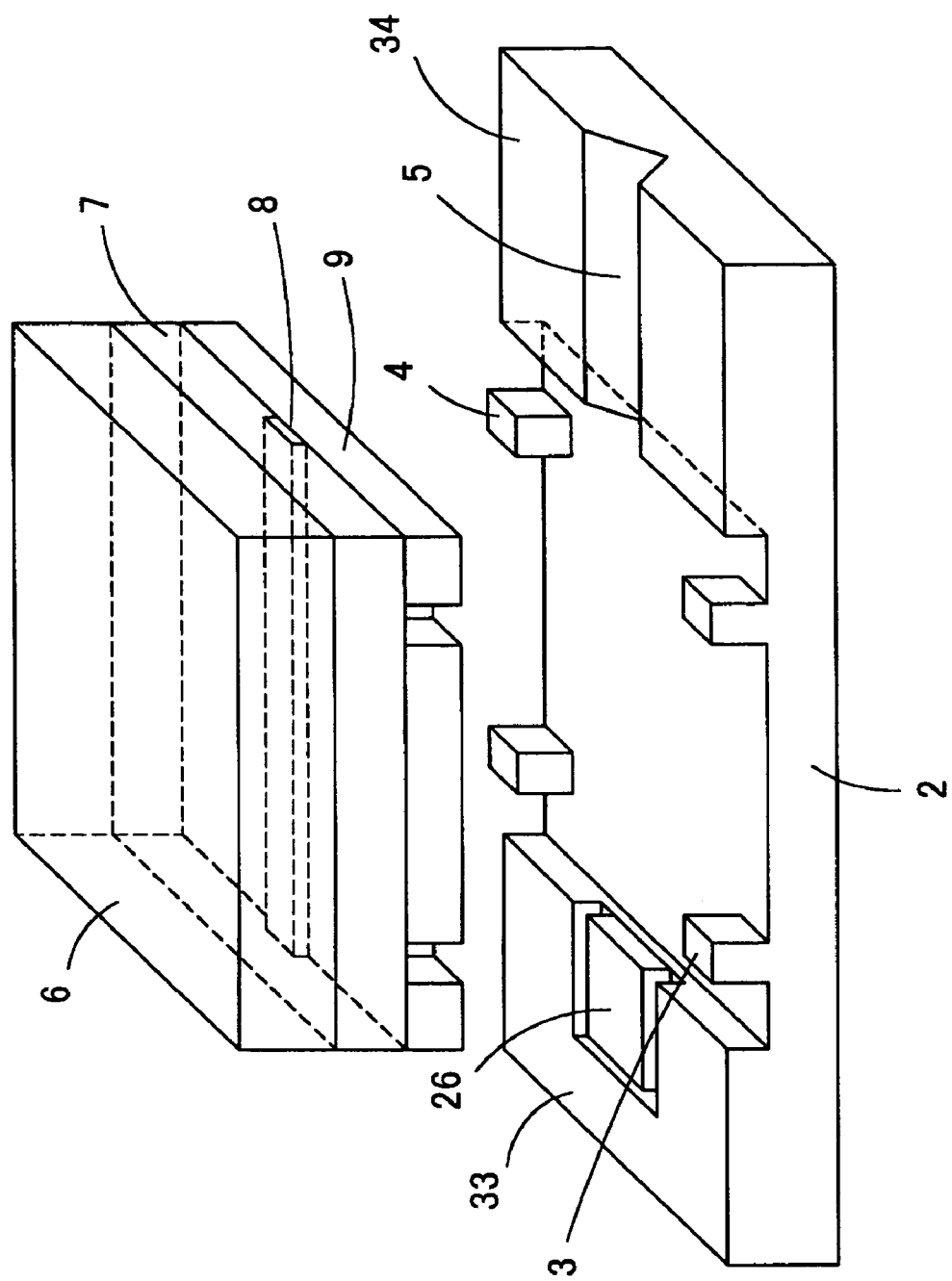
FIG. 26 is an exploded perspective view of the waveguide equipment shown in FIG. 25.
Figure 27:
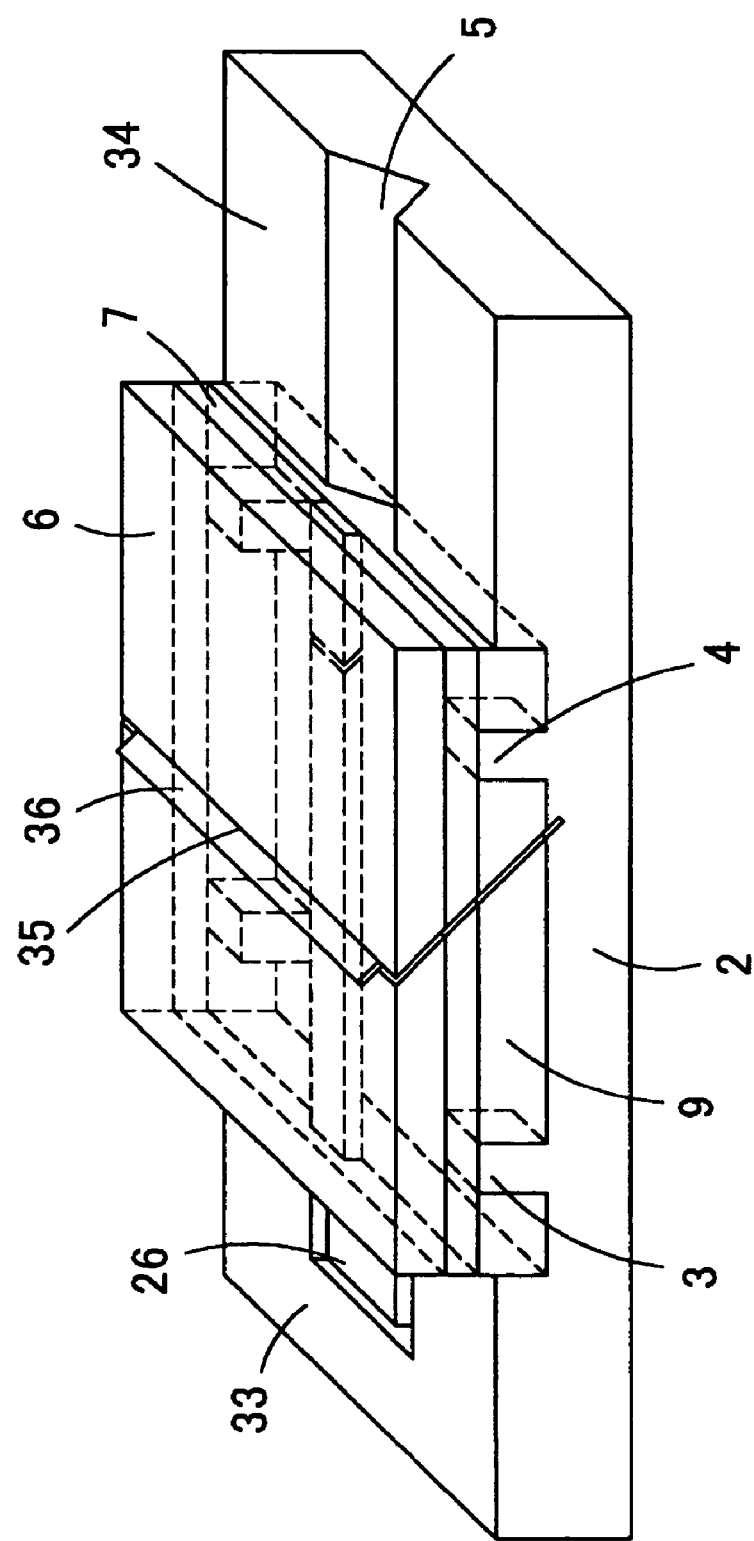
FIG. 27 is a perspective view showing waveguide equipment in accordance with one embodiment of the present invention.

FIG. 22 to FIG. 27 show the waveguide equipment, that is an embodiment of the present invention, according to a manufacturing process. FIG. 22 is a plan view showing gathering of several waveguide equipment. FIG. 23 is a sectional view of FIG. 22 cut by X5-X5 line. FIG. 24 is a plan view showing gathering of several waveguide equipment removed one part of the cover substrate and the upper cladding layer. FIG. 25 is a sectional view showing one of the gathering of the several waveguide equipment shown in FIG. 24. FIG. 26 is an exploded perspective view of the divided waveguide equipment shown in FIG. 25. FIG. 27 is a perspective view showing waveguide equipment which a filter was incorporated in.

In this embodiment, the area of the top surface of the spacers 3 and 4 is small, the length of a long side is less than 1 mm. According to an experiment, it is known that it is easy for the wrinkle of the lower cladding layer 9 to occur in the long side when the spacers 3 and 4 was seen as a rectangle in a plan view. This is because it is difficult for the resin for the cladding to be provided in the long side. When the area of the top surface of the spacers 3 and 4 is small, especially when the length of a long side is less than 1 mm, the occurrence of the wrinkle in the cladding layer 9 is prevented even if the difference of the height between the top surface of the spacers 3 and 4 and the inner bottom surface of the supporting substrate 2 is large. In this embodiment, the side length of the spacers 3 and 4 is made less than 1 mm and plural of the spacers 3 and 4 is supporting the upper cladding layer 7. A supporting portion 33 and a V-shaped groove portion 34 is formed to be separated from the spacers 3 and 4 by making the side length of the spacers 3 and 4 short. The metal pattern 26 is disposed on the supporting portion 33 and the groove 5 is formed on the groove portion 34.

An upper limit of a preferred area of the spacers 3 and 4 can be prescribed with another form. It is preferable for the area of the spacers 3 and 4 to be less than 10%, especially less than 3%, of the area of the supporting substrate 2.

The spacers 3 and 4 of the supporting mother substrate 2A which contact the lower face of the upper cladding layer 7 support the cover mother substrate 6A and the upper cladding layer 7. The lower cladding layer 9 is formed by the resin to be applied between the supporting mother substrate 2A and the upper cladding layer 7. FIG. 23 and FIG. 24 show this state.

The cover mother substrate 6A and the upper cladding layer 7 opposed to the supporting portion 33 and the groove portion 34 is cut off by dicing. Thus, the supporting portion 33 and the groove portion 34 are exposed as shown in FIG. 24 and FIG. 25.

After above process, the each piece of waveguide equipment is made by separating the gathering of the pieces of waveguide equipment by dicing, the dam part 11 is removed, the end portion of the supporting substrate 2 is cut off, and the end of the groove 5 is exposed at the end of the supporting substrate 2. FIG. 26 shows this state in an exploded perspective view.

A slit 35 is formed diagonally by cutting one part of the cover substrate 6, the upper cladding layer, the core 8, the lower cladding layer 9 and the supporting substrate 2. A filter 36 which transmits light in a certain wavelength region and reflects light in another wavelength region is inserted in the slit 35. Thus, the light in a certain wavelength region is only propagated in the core 8 selectively.

The occurrence of the wrinkle in the lower cladding layer 9 can be decreased by making the spacers 3 and 4 thinner. Thus, the loss by leakage of the light propagating in the core 8 can be lowered.

What is claimed is:

1. Waveguide equipment comprising:
   a first substrate;
   an upper cladding layer disposed on the first substrate;
   a core disposed on the upper cladding;
   a lower cladding layer disposed on the upper cladding layer to surround the core;
   a second substrate having a spacer to support the upper and a recess to receive the lower cladding layer; and
   a groove configured to position a communication cable, the groove being formed in the second substrate in a substantially straight shape from a bottom portion of the spacer toward the core,
   wherein the recess of the second substrate has an intermediate surface and the height of the intermediate surface is selected to be positioned between an inner bottom surface of the recess and a top surface of the spacer, and wherein the intermediate surface is located between the spacer and the inner bottom surface of the recess in the direction with which the groove is aligned.

2. The waveguide equipment according to claim 1, wherein the intermediate surface connects to the spacer.

3. The waveguide equipment according to the claim 1, wherein the intermediate surface is below the core.

4. The waveguide equipment according to claim 1, wherein a difference of height between the top surface of the spacer and the intermediate surface is less than 20 µm.

5. Waveguide equipment comprising:
a first substrate;
an upper cladding layer disposed on the first substrate;
a core disposed on the upper cladding;
a lower cladding layer disposed on the upper cladding layer to surround the core; and
a second substrate having a spacer to support the upper cladding layer and a recess to receive the lower cladding layer,
wherein the recess of the second substrate has an intermediate surface and the height of the intermediate surface is selected to be positioned between an inner bottom surface of the recess and a top surface of the spacer, and wherein an outer portion of the spacer is tapered.

6. The waveguide equipment according to claim 1, wherein an area of the top surface of the spacer is less than 10% of that of the second substrate in a plan view.

7. Waveguide equipment comprising:
a first substrate;
an upper cladding layer disposed on the first substrate;
a core disposed on the upper cladding;
a lower cladding layer disposed on the upper cladding layer to surround the core; and
a second substrate having a spacer to support the upper cladding layer and a recess to receive the lower cladding layer,
wherein the recess of the second substrate has an intermediate surface and the height of the intermediate surface is selected to be positioned between an inner bottom surface of the recess and a top surface of the spacer, and wherein the top surface of the spacer is less than 1 mm on a side.

8. A method of manufacturing waveguide equipment comprising:
forming an upper cladding layer on a first substrate;
forming a core on the upper cladding layer;
forming a second substrate, wherein the second substrate has a spacer and a recess having an intermediate surface positioned between an inner bottom surface of the recess and an top surface of the spacer;
applying resin on the second substrate;
placing the upper cladding layer formed on the first substrate on the second substrate so as to be supported by the spacer;
forming a lower cladding layer by curing the resin; and
providing a groove in the second substrate to position a communication cable, the groove being formed in a substantially straight shape from a bottom portion of the spacer toward the core,
wherein the intermediate surface is located between the spacer and the inner bottom surface of the recess in the direction with which the groove is aligned.

9. The method according to the claim 8, further comprising: cutting off the spacer.

10. The waveguide equipment according to claim 5, wherein the intermediate surface is below the core.

11. The waveguide equipment according to claim 5, wherein a difference of the height between the top of surface of the spacer and the intermediate surface is less than 20 µm.

12. The waveguide equipment according to claim 5, wherein area of the top surface of the spacer is less than 10% of that of the second substrate in a plan view.

13. The waveguide equipment according to claim 7, wherein the intermediate surface connects to the spacer.

14. The waveguide equipment according to claim 7, wherein the intermediate surface is below the core.

15. The waveguide equipment according to claim 7, wherein a difference of the height between the top of surface of the spacer and the intermediate surface is less than 20 µm.

16. The waveguide equipment according to claim 7, wherein area of the top surface of the spacer is less than 10% of that of the second substrate in a plan view.

17. A method of manufacturing waveguide equipment comprising:
forming an upper cladding layer on a first substrate;
forming a core on the upper cladding layer;
forming a second substrate, wherein the second substrate has a spacer and a recess having an intermediate surface positioned between an inner bottom surface of the recess and an top surface of the spacer;
applying resin on the second substrate;
placing the upper cladding formed on the first substrate on the second substrate so as to be surrounded by the spacer; and
forming a lower cladding layer by curing the resin,
wherein an outer portion of the spacer is tapered.

18. The method according to the claim 17, further comprising: cutting off the spacer.

19. A method of manufacturing waveguide equipment comprising:
forming an upper cladding layer on a first substrate;
forming a core on the upper cladding layer:
forming a second substrate, wherein the second substrate has a spacer and a recess having an intermediate surface positioned between an inner bottom surface of the recess and a top surface of the spacer;
applying resin on the second substrate;
placing the upper cladding formed on the first substrate on the second substrate so as to be surrounded by the spacer; and
forming a lower cladding layer by curing the resin,
wherein the top surface of the spacer is less than 1 mm on a side.

20. The method according to claim 19, further comprising: cutting off the spacer.

* * * * *

UNITED STATES PATENT AND TRADEMARK OFFICE
CERTIFICATE OF CORRECTION

| | | |
|---|---|---|
| PATENT NO. | : 7,269,309 B2 | Page 1 of 1 |
| APPLICATION NO. | : 11/082519 | |
| DATED | : September 11, 2007 | |
| INVENTOR(S) | : Yoshiyuki Komura et al. | |

It is certified that error appears in the above-identified patent and that said Letters Patent is hereby corrected as shown below:

In the Claims:

In Claim 1, column 8, line 53, after the word "upper" the words --cladding layer -- are erroneously missing.

Signed and Sealed this

Fourth Day of December, 2007

JON W. DUDAS
*Director of the United States Patent and Trademark Office*